(12) United States Patent
Rodríguez Méndez et al.

(10) Patent No.: US 12,665,486 B2
(45) Date of Patent: Jun. 23, 2026

(54) HYBRID SWITCHED-CAPACITOR POWER CONVERTER

(71) Applicant: Hamilton Sundstrand Corporation, Charlotte, NC (US)

(72) Inventors: Juan Rodríguez Méndez, Gijón (ES); Diego González Lamar, Gijón (ES); Juan Ramon García Meré, Gijón (ES); Ignacio Castro Álvarez, Gijón (ES); Douglas Araujo Pedroso, São Borja (BR)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 153 days.

(21) Appl. No.: 18/428,400

(22) Filed: Jan. 31, 2024

(65) Prior Publication Data

US 2024/0266941 A1 Aug. 8, 2024

(30) Foreign Application Priority Data

Feb. 3, 2023 (EP) .................................... 23382099

(51) Int. Cl.
  *H02M 1/00* (2007.01)
  *H02M 3/07* (2006.01)
(52) U.S. Cl.
  CPC ........... *H02M 1/0095* (2021.05); *H02M 3/07* (2013.01)
(58) Field of Classification Search
  CPC ..... G05F 1/00; G05F 1/10; G05F 1/12; G05F 1/46; G05F 1/455; G05F 1/45;
  (Continued)

(56) References Cited

U.S. PATENT DOCUMENTS

| | | | | |
|---|---|---|---|---|
| 5,856,919 A | * | 1/1999 | Moriarty, Jr. ....... | H02M 1/4208 |
| | | | | 363/101 |
| 7,746,041 B2 | | 6/2010 | Xu et al. | |

(Continued)

FOREIGN PATENT DOCUMENTS

| | | |
|---|---|---|
| JP | 2021184671 A | 12/2021 |
| WO | 2022109416 A1 | 5/2022 |
| WO | 2022241035 A1 | 11/2022 |

OTHER PUBLICATIONS

European Search Report for Application No. 23382099.2, mailed Jun. 30, 2023, 9 pages.

(Continued)

*Primary Examiner* — Crystal L Hammond
*Assistant Examiner* — Nusrat Quddus
(74) *Attorney, Agent, or Firm* — CANTOR COLBURN LLP

(57) ABSTRACT

A hybrid switched-capacitor power converter for converting an input voltage into an output voltage. The power converter includes: an input voltage source configured to provide the input voltage, an output capacitor connected across a load, at least two inductors arranged in parallel branches of a circuit element between the input voltage source and the load, at least one switched capacitor connected between the parallel branches of the circuit element, and at least two switches operable to selectively charge and discharge the at least one switched capacitor and the at least two inductors. The power converter is configured to be operated in a switching cycle such that, at different stages in the switching cycle, the inductors and switched capacitor are selectively charged and discharged.

6 Claims, 23 Drawing Sheets

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/30; G05F 1/33; G05F 1/32; G05F 1/34; G05F 1/38; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 1/12; H02M 3/3155; H02M 3/33507; H02M 3/33546; H02M 7/1557; H02M 7/1626; H02M 7/219; H02M 7/151; H02M 5/4585; H02M 1/08; H02M 7/1552; H02M 7/1623; H02M 3/33592; H02M 3/137; H02M 7/00; H02M 7/064; H05B 39/048; B23K 11/24; H04B 2215/069; H02J 3/46; H02J 3/38; H02J 7/12

See application file for complete search history.

(56) References Cited

U.S. PATENT DOCUMENTS

| | | | | |
|---|---|---|---|---|
| 9,548,648 | B2 * | 1/2017 | Amaro | H02M 3/1588 |
| 10,033,276 | B2 * | 7/2018 | Shenoy | H02M 3/1584 |
| 10,256,729 | B1 * | 4/2019 | Notsch | H02M 1/14 |
| 10,658,928 | B2 | 5/2020 | Jong et al. | |
| 10,719,099 | B2 | 7/2020 | Puggelli et al. | |
| 10,770,972 | B2 | 9/2020 | Crossley et al. | |
| 10,903,738 | B2 * | 1/2021 | Zhang | H02M 3/07 |
| 11,088,615 | B2 * | 8/2021 | McBryde | H02M 1/08 |
| 11,245,330 | B2 | 2/2022 | Giuliano et al. | |
| 11,349,390 | B2 | 5/2022 | Kotikalapoodi | |
| 11,411,493 | B2 | 8/2022 | Liu et al. | |
| 11,496,045 | B2 | 11/2022 | Das et al. | |
| 2006/0087295 | A1 * | 4/2006 | Jang | H02M 3/1584 |
| | | | | 323/222 |
| 2012/0242299 | A1 * | 9/2012 | Xu | H02M 1/4225 |
| | | | | 323/210 |
| 2014/0354247 | A1 * | 12/2014 | Xu | H02M 1/0085 |
| | | | | 323/207 |
| 2015/0162828 | A1 * | 6/2015 | Sandner | H02J 7/02 |
| | | | | 323/271 |
| 2015/0214847 | A1 * | 7/2015 | Shimada | H02M 3/01 |
| | | | | 363/17 |
| 2015/0311792 | A1 * | 10/2015 | Amaro | H02M 3/1584 |
| | | | | 323/271 |
| 2015/0311793 | A1 * | 10/2015 | Khayat | H02M 3/158 |
| | | | | 323/271 |
| 2016/0056726 | A1 * | 2/2016 | Sander | H02M 3/33546 |
| | | | | 363/21.04 |
| 2016/0126908 | A1 * | 5/2016 | King | H03F 3/2171 |
| | | | | 330/251 |
| 2016/0197552 | A1 * | 7/2016 | Giuliano | H02M 3/07 |
| | | | | 363/60 |
| 2018/0166973 | A1 * | 6/2018 | Luerkens | H02M 3/156 |
| 2018/0287500 | A1 * | 10/2018 | Tsutsui | H02M 3/1584 |
| 2019/0280618 | A1 * | 9/2019 | Yan | H02M 7/4837 |
| 2020/0091818 | A1 * | 3/2020 | Toni | H02M 3/07 |
| 2020/0321868 | A1 * | 10/2020 | Michal | H02M 3/07 |
| 2020/0328676 | A1 | 10/2020 | Le et al. | |
| 2022/0181967 | A1 * | 6/2022 | Petersen | H02M 3/07 |
| 2022/0368218 | A1 | 11/2022 | Liu et al. | |
| 2022/0407423 | A1 * | 12/2022 | Chen | H02M 3/1586 |
| 2023/0041194 | A1 * | 2/2023 | Tang | H02M 1/0051 |
| 2024/0006991 | A1 * | 1/2024 | Hashimoto | H02M 1/0058 |

OTHER PUBLICATIONS

Machine Translation for JP2021184671 (A), Published: Dec. 2, 2021, 16 pages.

Sanjaya Maniktala, "Discovering New Topologies", In: "Witching Power Supplies A-Z", Jan. 2012, pp. 343-402.

* cited by examiner

HYBRID SWITCHED-CAPACITOR POWER CONVERTER

CROSS REFERENCE TO RELATED APPLICATIONS

This application claims priority to European Patent Application No. 23382099.2 filed Feb. 3, 2023, the entire contents of which is incorporated herein by reference.

FIELD

The present invention relates to a power converter. More particularly, the present invention relates to a hybrid switched capacitor power converter for converting a first input voltage into a second, different, output voltage.

BACKGROUND

In general, magnetic components (e.g. inductors) are the largest and heaviest components of a power converter. It is desirable to reduce the size and weight of power converters, particularly when said converters are for use in vehicles such as automobiles and aircraft. The most effective way to reduce the size and weight of power converters is to reduce the size and weight of the inductors by reducing the total amount of energy which needs to be stored by inductors. Doing so depends on being able to increase the switching frequency of the converter, but increasing the switching frequency is not always possible due to losses that impact the thermal performance of the converter and the efficiency, which impact both size and weight.

Hybrid switched-capacitor converters (HSCCs) go some way to solving the problems mentioned above. In comparison to conventional topologies, HSCCs generally increase the number of switches and capacitors which can help to reduce the amount of energy stored by magnetics elements, thus reducing the overall converter size and weight. Moreover, they also reduce the voltage stresses across the switches, which enables higher switching frequencies, the use of switches with better figure of merit (FOM) and contributes to further increase the power density.

A drawback of many known HSCCs, however, is their complex control, not only due to the higher number of switches, but because, in general, the voltage across the extra capacitors should be actively balanced.

SUMMARY

The disclosure provides a hybrid switched-capacitor power converter for converting an input voltage into an output voltage. The power converter includes an input voltage source configured to provide the input voltage, an output capacitor connected across a load at which the output voltage is provided and at least two inductors arranged in parallel branches of a circuit element between the input voltage source and the load. The converter also includes at least one switched capacitor connected between the parallel branches of the circuit element, and at least two switches operable to selectively charge and discharge the at least one switched capacitor and the at least two inductors. The power converter is configured to be operated in a switching cycle such that, at different stages in the switching cycle, the at least two inductors and the at least one switched capacitor are selectively charged and discharged.

Such a power converter may be referred to as a parallel-capacitor power converter. The (e.g. at least two switches of the) power converter may be arranged to be operated in the switching cycle, such that the at least one switched capacitor is selectively isolated.

In some examples, the power converter comprises one fewer switched capacitor than the number of inductors (and, e.g., the number of switches).

It will be understood that, where used herein, a component, such as a switch or diode rectifier, is 'on' when it is closed such that current may (is allowed to) flow though the component, and 'off' when it is open such that current cannot (is prevented from) flow through the component. Thus the switches (and, e.g., diode rectifiers) may be arranged to control operation of the power converter.

In some examples, the power converter is a step-down converter (e.g. a buck converter) arranged to convert and input voltage to an output voltage, wherein the output voltage is lower than the input voltage.

In some examples, the power converter is configured to provide a voltage conversion ratio in the range $$\frac{N^2 - 1}{N^2} \text{ to } 1,$$

where N is the number of phases of the power converter (equal to the number of branches (and inductors) in the circuit element of the power converter). The power converter may be configured to provide a voltage conversion ratio in the range 0.75-1.

It will be understood that where referred to herein, the voltage conversion ratio is equal to the output voltage divided by the input voltage.

In some examples, the power converter comprises two inductors and two switches. In such a case, the power (e.g. buck) converter comprises: a first inductor arranged in a first branch of the circuit element; a second inductor arranged in a second branch of the circuit element, in parallel with the first branch; a first switch arranged in the first branch of the circuit element; a second switch arranged in the second branch of the circuit element; and a switched capacitor connected between the first and second branches of the circuit element.

In these examples, the switching cycle may comprise: a first state, in which the first and second switches are on, such that the first and second inductors are charged (store energy) and the switched capacitor is disconnected (isolated); a second state, in which the first switch is on and the second switch is off, such that the first inductor and the switched capacitor are charged and the second inductor is discharged (delivers energy); a third state, which is equivalent to the first state; and a fourth state, in which the second switch is on and the first switch is off, such that the second inductor is charged and the first inductor and the switched capacitor are discharged.

The switched capacitor may be connected to the first branch of the circuit element between the first switch and the first inductor. The switched capacitor may be connected to the second branch of the circuit element between the second switch and the second inductor.

The first switch may be arranged in the first branch of the circuit element closer to the input voltage source than the first inductor. The second switch may be arranged in the second branch of the circuit element closer to the input voltage source than the second inductor.

In some examples, the power converter comprises at least two diode rectifiers arranged to control the flow of current in the power converter, e.g. through the first and/or second branches and/or to the switched capacitor. In one example, a first diode rectifier is arranged (in series) between the switched capacitor and ground. In one example, a second diode rectifier is arranged in series with the switched capacitor between the first and second branches of the circuit element, e.g. between the switched capacitor and the second branch of the circuit element.

The first diode rectifier may be arranged to allow current to flow from ground through the switched capacitor to the first branch of the circuit element. The second diode rectifier may be arranged to allow current to flow from the switched capacitor to the second branch of the circuit element. The second diode rectifier may be connected from between the switched capacitor and the first diode rectifier, to the second branch of the circuit element.

In some examples, the switching cycle may comprise: a first state, in which the first and second switches are on, and the first and second diode rectifiers are off (prevent current from flowing therethrough), such that the first and second inductors are charged and the switched capacitor is disconnected; a second state, in which the first switch and the second diode rectifier are on (allowing current to flow therethrough), and the second switch and first diode rectifier are off, such that the first inductor and the switched capacitor are charged and the second inductor is discharged; a third state, which is equivalent to the first state; and a fourth state in which the second switch and the first diode rectifier are on, and the first switch and the second diode rectifier are off, such that the second inductor is charged and the first inductor and the switched capacitor are discharged.

In some examples, the power converter is a step-up converter (e.g. a boost converter) such that the output voltage is greater than the input voltage.

In some examples, the power converter is configured to provide a voltage conversion ratio in the range $$1 \text{ to } \frac{N^2}{N^2 - 1}.$$

The power converter may be configured to provide a voltage conversion ratio in the range 1-1.33.

In some examples, the power converter comprises two inductors and two switches. As such the power (e.g. boost) converter can comprise: a first inductor arranged in a first branch of the circuit element; a second inductor arranged in a second branch of the circuit element, in parallel with the first branch; a switched capacitor connected between the first and second branches of the circuit element; a first switch arranged (e.g. in series) between the switched capacitor and ground; and a second switch arranged in series with the switched capacitor between the first and second branches of the circuit element.

In these examples, the switching cycle may comprise: a first state, in which the first switch is on and the second switch is off, such that the first inductor and the switched capacitor are charged and the second inductor is discharged; a second state, in which the first and second switches are off, such that the first and second inductors are discharged and the switched capacitor is disconnected; a third state, in which the second switch is on and the first switch is off, such that the second inductor is charged and the first inductor and the switched capacitor are discharged; and a fourth state, which is equivalent to the second state.

The second switch may be connected from between the switched capacitor and the first switch, to the second branch of the circuit element.

In some examples, the power converter comprises at least two diode rectifiers arranged to control the flow of current in the power converter, e.g. through the first and/or second branches and/or to the switched capacitor. In one example, a first diode rectifier is arranged in the first branch of the circuit element, e.g. in series with the first inductor. In one example, a second diode rectifier is arranged in the second branch of the circuit element, e.g. in series with the second inductor.

The first diode rectifier may be arranged in the first branch of the circuit element closer to the output capacitor (and the load) than the first inductor. The second diode rectifier may be arranged in the second branch of the circuit element closer to the output capacitor (and the load) than the second inductor.

The first diode rectifier may be arranged to allow current to flow from the first branch of the circuit element to the output capacitor (and the load). The second diode rectifier may be arranged to allow current to flow from the second branch of the circuit element to the output capacitor (and the load).

The switched capacitor may be connected to the first branch of the circuit element between the first inductor and the first diode rectifier. The switched capacitor may be connected to the second branch of the circuit element between the second inductor and the second diode rectifier.

In some examples, the switching cycle may comprise: a first state, in which the first switch and the second diode rectifier are on and the second switch and first diode rectifier are off, such that the first inductor and the switched capacitor are charged and the second inductor is discharged; a second state, in which the first and second diode rectifiers are on, and the first and second switches are off, such that the first and second inductors are discharged and the switched capacitor is disconnected; a third state, in which the second switch and the first diode rectifier are on, and the first switch and the second diode rectifier are off, such that the second inductor is charged and the first inductor and the switched capacitor are discharged; and a fourth state, which is equivalent to the second state.

In some examples, the power converter may be arranged to have the ability to operate both as a step-up (boost) converter and a step-down (buck) converter (although it will be appreciated that in any particular mode of operation, the converter may be operated either as a step-up converter or a step-down converter).

Thus, in some example, the (e.g. buck-boost) power converter comprises: a first inductor arranged in a first branch of the circuit element; a second inductor arranged in a second branch of the circuit element, in parallel with the first branch; a first switch arranged in the first branch of the circuit element; a second switch arranged in the second branch of the circuit element; a first switched capacitor connected between the first and second branches of the circuit element; a second switched capacitor connected between the first and second branches of the circuit element; a third switch arranged (e.g. in series) between the second switched capacitor and ground; and a fourth switch arranged in series with the second switched capacitor between the first and second branches of the circuit element.

It will be appreciated that in these examples, the (buck-boost) power converter comprises a combination of the elements from the buck converter and the boost converter described above. In particular, the (buck-boost) power converter comprises two switched capacitors arranged (e.g. in parallel with each other) between the two branches of the circuit element, one with switches (e.g. in series) with the (second) switched capacitor and one with the switches in the first and second branches of the circuit element.

In one example, the first and second switched capacitors are connected between the first and second branches of the circuit element either side of the first and second inductors. In one example, the first switched capacitor is connected between the first and second branches of the circuit element proximal to the input voltage source (e.g. closer than the first and second inductors) and/or the second switched capacitor is connected between the first and second branches of the circuit element proximal to the output capacitor (and the load) (e.g. closer than the first and second inductors).

In step-down (buck) mode of operation, the third and fourth switches are off, such that the second switched capacitor is disconnected. In this case, the switching cycle comprises four states (as outlined above for the buck converter) that involve operation of the first and second switches, the first and second inductors and the first switched capacitor.

In step-up (boost) mode of operation, the first and second switches are on, and the first and second diode rectifiers are off such that the first switched capacitor is disconnected. In this case, the switching cycle comprises four states (as outlined above for the boost converter) that involve operation of the third and fourth switches, the first and second inductors and the second switched capacitor.

The first switched capacitor may be connected to the first branch of the circuit element between the first switch and the first inductor. The first switched capacitor may be connected to the second branch of the circuit element between the second switch and the second inductor.

The first switch may be arranged in the first branch of the circuit element closer to the input voltage source than the first inductor. The second switch may be arranged in the second branch of the circuit element closer to the input voltage source than the second inductor.

In some examples, the power converter comprises at least two diode rectifiers arranged to control the flow of current in the power converter, e.g. through the first and/or second branches and/or to the first switched capacitor. In one example, a first diode rectifier is arranged (in series) between the first switched capacitor and ground. In one example, a second diode rectifier is arranged in series with the first switched capacitor between the first and second branches of the circuit element, e.g. between the first switched capacitor and the second branch of the circuit element.

The first diode rectifier may be arranged to allow current to flow from ground through the first switched capacitor to the first branch of the circuit element. The second diode rectifier may be arranged to allow current to flow from the first switched capacitor to the second branch of the circuit element. The second diode rectifier may be connected from between the first switched capacitor and the first diode rectifier, to the second branch of the circuit element.

The fourth switch may be connected from between the second switched capacitor and the third switch, to the second branch of the circuit element.

In some examples, the power converter comprises at least two (further) diode rectifiers arranged to control the flow of current in the power converter, e.g. through the first and/or second branches and/or to the second switched capacitor. In one example, a third diode rectifier is arranged in the first branch of the circuit element, e.g. in series with the first inductor. In one example, a fourth diode rectifier is arranged in the second branch of the circuit element, e.g. in series with the second inductor.

The third diode rectifier may be arranged in the first branch of the circuit element closer to the output capacitor (and the load) than the first inductor. The fourth diode rectifier may be arranged in the second branch of the circuit element closer to the output capacitor (and the load) than the second inductor.

The third diode rectifier may be arranged to allow current to flow from the first branch of the circuit element to the output capacitor (and the load). The second diode rectifier may be arranged to allow current to flow from the second branch of the circuit element to the output capacitor (and the load).

The second switched capacitor may be connected to the first branch of the circuit element between the first inductor and the third diode rectifier. The second switched capacitor may be connected to the second branch of the circuit element between the second inductor and the fourth diode rectifier.

In these examples (when the power converter comprises the first, second, third and fourth diode rectifiers), in a step-down (buck) mode of operation, the third and fourth switches are off, and the third and fourth diode rectifiers are on, such that the second switched capacitor is disconnected. In this case, the switching cycle comprises four states (as outlined above for the buck converter) that involve operation of the first and second switches, the first and second diode rectifiers, the first and second inductors and the first switched capacitor.

In step-up (boost) mode, the first and second switches are on, and the first and second diode rectifiers are off such that the first switched capacitor is disconnected. In this case, the switching cycle comprises four states (as outlined above for the boost converter) that involve operation of the third and fourth switches, the third and fourth diode rectifies, the first and second inductors and the second switched capacitor.

In some examples, the (buck-boost) power converter may be configured to provide a continuous range of voltage conversion ratios. A continuous range of voltage conversion ratios will be understood to mean that the range of available voltage conversion ratios covers ratios less than 1, and greater than 1, substantially without a gap between the available ratios less than 1 and the available ratios greater than 1 in which there are conversion ratios which are substantially not available.

In some examples, the power (buck-boost) converter is configured to provide a voltage conversion ratio in the range $$\frac{N^2 - 1}{N^2} \text{ to } \frac{N^2}{N^2 - 1}.$$

Where N=2, the power converter may be configured to provide a voltage conversion ratio in the range 0.75-1.33.

The power converter may have any suitable and desired number of phases, i.e. number of branches in the circuit element. In some examples, the power converter is a two-phase power converter, e.g. as described in relation to some of the above examples. In some examples, the power converter comprises three (or more) phases.

Thus, in some examples, the power converter comprises: a first inductor arranged in a first branch of the circuit element; a second inductor arranged in a second branch of the circuit element, in parallel with the first branch; a third inductor arranged in a third branch of the circuit element, in parallel with the second (and first) branch; a first switched capacitor and a second switched capacitor connected between the first and second branches of the circuit element; and at least three switches operable to selective charge and discharge the first switched capacitor and the second switched capacitor. The power converter is configured to be operated in a switching cycle such that, at different stages in the switching cycle, the first inductor, the second inductor, the third inductor, the first switched capacitor and the second switched capacitor are selectively charged and discharged.

As in other examples, the power capacitor may be arranged as a step-down (buck) converter and/or a step-up (boost) converter. In some examples, the power (e.g. buck) converter comprises: a first inductor arranged in a first branch of the circuit element; a second inductor arranged in a second branch of the circuit element, in parallel with the first branch; a third inductor arranged in a third branch of the circuit element, in parallel with the second (and first) branch; a first switch arranged in the first branch of the circuit element; a second switch arranged in the second branch of the circuit element; a third switch arranged in the third branch of the circuit element; a first switched capacitor connected between the first and second branches of the circuit element; and a second switched capacitor connected between the first and second branches of the circuit element.

In these examples, the switching cycle may comprise: a first state, in which the first, second and third switches are on, such that the first, second and third inductors are charged (store energy) and the first and second switched capacitors are disconnected (isolated); a second state, in which the first and third switches are on and the second switch is off, such that the first and third inductors and the first switched capacitor are charged and the second inductor and the second switched capacitor are discharged (delivers energy); a third state, which is equivalent to the first state; a fourth state, in which the first and second switches are on and the third switch is off, such that the first and second inductors and the second switched capacitor is charged, the third inductor is discharged and the first capacitor is disconnected; a fifth state, which is equivalent to the first (and third) state; and a sixth state, in which the second and third switches are on and the first switch is off, such that the second and third inductors are charged, the first inductor and the first switched capacitor are discharged, and the second switched capacitor is disconnected.

The first and second switched capacitors may be connected to the first branch of the circuit element between the first switch and the first inductor. The first and second switched capacitors may be connected to the second branch of the circuit element between the second switch and the second inductor.

The first switch may be arranged in the first branch of the circuit element closer to the input voltage source than the first inductor. The second switch may be arranged in the second branch of the circuit element closer to the input voltage source than the second inductor. The third switch may be arranged in the third branch of the circuit element closer to the input voltage source than the third inductor.

In some examples, the (e.g. three-phase buck) power converter comprises at least three diode rectifiers arranged to control the flow of current in the power converter, e.g. through the first, second and/or third branches and/or to the first and second switched capacitors. In one example, a first diode rectifier is arranged (in series) between the first switched capacitor and ground.

In one example, a second diode rectifier is arranged in series with the first and second switched capacitors between the first and second branches of the circuit element, e.g. between the first and second switched capacitors, e.g. the second switched capacitor is arranged between the second diode rectifier and the second branch of the circuit element. The second diode rectifier may be connected from between the first switched capacitor and the first diode rectifier, to the second branch of the circuit element.

In one example, a third diode rectifier is arranged in series with the second diode rectifier, between the second diode rectifier and the third branch of the circuit element. The third diode rectifier may be connected from between the second diode rectifier and the second switched capacitor, to the third branch of the circuit element.

The first diode rectifier may be arranged to allow current to flow from ground through the first switched capacitor to the first branch of the circuit element. The second diode rectifier may be arranged to allow current to flow from the first switched capacitor to the second branch of the circuit element via the second switched capacitor. The third diode rectifier may be arranged to allow current to flow from the second switched capacitor to the third branch of the circuit element.

In these examples, the switching cycle may comprise: a first state, in which the first, second and third switches are on, and the first, second and third diode rectifiers are off (prevent current from flowing therethrough), such that the first, second and third inductors are charged (store energy) and the first and second switched capacitors are disconnected (isolated); a second state, in which the first and third switches and the second diode rectifier are on, and the second switch and the first and third diode rectifiers are off, such that the first and third inductors and the first switched capacitor are charged and the second inductor and the second switched capacitor are discharged (delivers energy); a third state, which is equivalent to the first state; a fourth state, in which the first and second switches and the third diode rectifier are on, and the third switch and the first and second diode rectifiers are off, such that the first and second inductors and the second switched capacitor is charged, the third inductor is discharged and the first capacitor is disconnected; a fifth state, which is equivalent to the first (and third) state; and a sixth state, in which the second and third switches and the first diode rectifier are on, and the first switch and the second and third diode rectifiers are off, such that the second and third inductors are charged, the first inductor and the first switched capacitor are discharged, and the second switched capacitor is disconnected.

In some examples, the power (e.g. boost) converter comprises: a first inductor arranged in a first branch of the circuit element; a second inductor arranged in a second branch of the circuit element, in parallel with the first branch; a third inductor arranged in a third branch of the circuit element, in parallel with the second (and first) branch; a first switched capacitor connected between the first and second branches of the circuit element; a second switched capacitor connected between the first and second branches of the circuit element; a first switch arranged (e.g. in series) between the first switched capacitor and ground; a second switch arranged in series with the first switched capacitor between the first and second branches of the circuit element; and a third switch arranged in series with the first switched capacitor between the first and third branches of the circuit element.

In these examples, the switching cycle may comprise: a first state, in which the first switch is on and the second and third switches are off, such that the first inductor and the first switched capacitor are charged (store energy), the second and third inductors are discharged (deliver energy) and the second switched capacitor is disconnected (isolated); a second state, in which the first, second and third switches are off, such that the first, second and third inductors are discharged and the first and second switched capacitors are disconnected; a third state, in which the second switch is on and the first and third switches are off, such that the second inductor and the second switched capacitor are charged and the first and third inductors and the first switched capacitor are discharged; a fourth state, which is equivalent to the second state;

a fifth state, in which the third switch is on and the first and second switches are off, such that the third inductor is charged, the first and second inductors and the second switched capacitor are discharged and the first switched capacitor is disconnected; and a sixth state, which is equivalent to the second (and fourth) state.

The second switch may be connected from between the first switched capacitor and the first switch, to the second branch of the circuit element. The second switch may be connected from between the first switched capacitor and the first switch, and the second switched capacitor.

The third switch may be connected from between the second switch and the second switched capacitor, to the third branch of the circuit element.

In some examples, the (e.g. three-phase boost) power converter comprises at least three diode rectifiers arranged to control the flow of current in the power converter, e.g. through the first, second and/or third branches and/or to the first and second switched capacitors. In one example, a first diode rectifier is arranged in the first branch of the circuit element, e.g. in series with the first inductor.

In one example, a second diode rectifier is arranged in the second branch of the circuit element, e.g. in series with the second inductor. In one example, a third diode rectifier is arranged in the third branch of the circuit element, e.g. in series with the third inductor.

The first diode rectifier may be arranged in the first branch of the circuit element closer to the output capacitor (and the load) than the first inductor. The second diode rectifier may be arranged in the second branch of the circuit element closer to the output capacitor (and the load) than the second inductor. The third diode rectifier may be arranged in the third branch of the circuit element closer to the output capacitor (and the load) than the third inductor.

The first diode rectifier may be arranged to allow current to flow from the first branch of the circuit element to the output capacitor (and the load). The second diode rectifier may be arranged to allow current to flow from the second branch of the circuit element to the output capacitor (and the load). The third diode rectifier may be arranged to allow current to flow from the third branch of the circuit element to the output capacitor (and the load).

The first switched capacitor may be connected to the first branch of the circuit element between the first inductor and the first diode rectifier. The second switched capacitor may be connected to the second branch of the circuit element between the second inductor and the second diode rectifier. The third switch may be connected to the third branch of the circuit element between the third inductor and the third diode rectifier.

In some examples, the switching cycle may comprise: a first state, in which the first switch and second and third diode rectifiers are on and the second and third switches and the first diode are off (prevent current from flowing therethrough), such that the first inductor and the first switched capacitor are charged (store energy), the second and third inductors are discharged (deliver energy) and the second switched capacitor is disconnected (isolated); a second state, in which the first, second and third diode rectifiers are on, the first, second and third switches are off, such that the first, second and third inductors are discharged and the first and second switched capacitors are disconnected; a third state, in which the second switch and the first and third diode rectifiers are on and the first and third switches and the second diode rectifier are off, such that the second inductor and the second switched capacitor are charged and the first and third inductors and the first switched capacitor are discharged; a fourth state, which is equivalent to the second state; a fifth state, in which the third switch and the first and second diode rectifiers are on and the first and second switches and the third diode rectifier are off, such that the third inductor is charged, the first and second inductors and the second switched capacitor are discharged and the first switched capacitor is disconnected; and a sixth state, which is equivalent to the second (and fourth) state.

It will be appreciated that the power converter is configured to be operated in the switching cycle such that the states are performed in the temporal order: first state, second state, third state, fourth state, etc. The power converter may be configured to perform the switching cycle repeatedly, e.g. such that the power converter switches between the first state, the second state, the third state, the fourth state, etc., and then back to the first state, the second state, the third state, the fourth state, etc., repeatedly.

BRIEF DESCRIPTION OF DRAWINGS

One or more non-limiting examples will now be described, by way of example only, and with reference to the accompanying figures in which.

DETAILED DESCRIPTION

The below described examples will be understood to be exemplary only.

Figure 1:
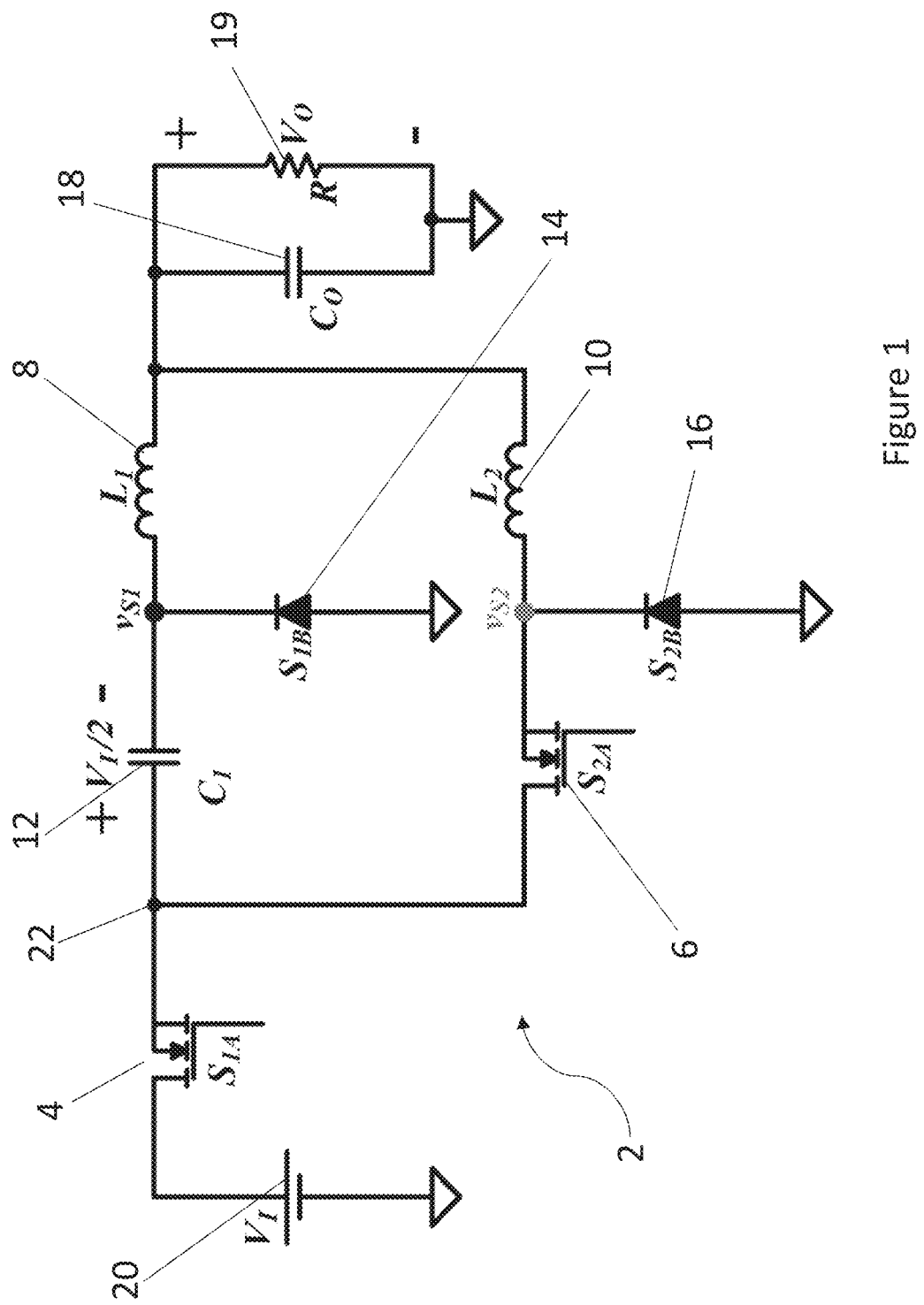
FIG. 1 shows a diagram of a conventional hybrid switched-capacitor converter (HSCC)

FIG. 1 shows a schematic diagram of a conventional hybrid switched-capacitor converter (HSCC) 2. The example shown in FIG. 1 is a series-capacitor buck converter.

The HSCC 2 comprises two switches S1A 4 and S2A 6, two inductors L1 8 and L2 10, a switched capacitor C1 12, two diode rectifiers S1B 14 and S2B 16, and an output capacitor CO 18 connected across a load R 19.

A first switching power converter stage comprises a switch S1A 4, an output inductor L1 8 and an output diode rectifier S1B 14. During the switching cycle, this switching power converter stage temporarily provides a voltage across the output inductor L1 8 and the output capacitor CO 18 that is equal to the input stage voltage VI minus the switched capacitor voltage.

A second switching power converter stage comprises a switch S2A 6, an output inductor L2 10 and an output diode rectifier S2B 16. This switching power converter stage, during one switching cycle, temporarily provides a voltage across the output inductor L2 10 and the output capacitor CO 18 which is equal to the switched capacitor voltage.

The switches S1A 4 and S2A 6 are on cascaded switching power converter stages that can be viewed as connected in series between the input stage and the output stage. The input stage comprises a voltage source 20 and the output stage comprises the output capacitor CO. A junction point 22 is located between the series connected switches S1A 4 and S2A 6. The junction point 22 connects to the output stage through the switched capacitor C1 12 and the inductor L1 8.

The switched capacitor C1 is coupled to the first and second switching power converter stages. The switched capacitor C1 12 acts as a voltage divider to divide the input voltage VI. In this arrangement, the switched capacitor C1 temporarily stores energy during a switching cycle for delivery to the output stage such that the temporarily stored energy is proportional to the duty cycle. During the steady state, the voltage across the switched capacitor is the output voltage VO divided by the duty cycle D.

During the steady state operation, the switched capacitor C1 is temporarily charged with a fraction of the input voltage VI to provide the same volt-second product across each individual inductor L1 and L2 for each of the switching power converter stages.

In comparison to conventional topologies (such as standard buck converters with large inductors), the HSCC 2 shown in FIG. 1 increases the number of switches and capacitors which, in turn, reduces the amount of energy stored by magnetic elements such as inductors, thus reducing the overall converter size and weight. Moreover, HSCCs also reduce the voltage stresses across the switches, which enables higher switching frequencies, the use of switches with better FOM and contributes to further increase the power density. The drawbacks of conventional HSCCs are their fixed output voltage ratio and complex control, not only due to the higher number of switches, but because the voltage across the extra capacitors must be actively balanced. The HSCC 2 shown in FIG. 1 is capable of operating at conversion ratios between 0 and 0.25.

Figure 2:
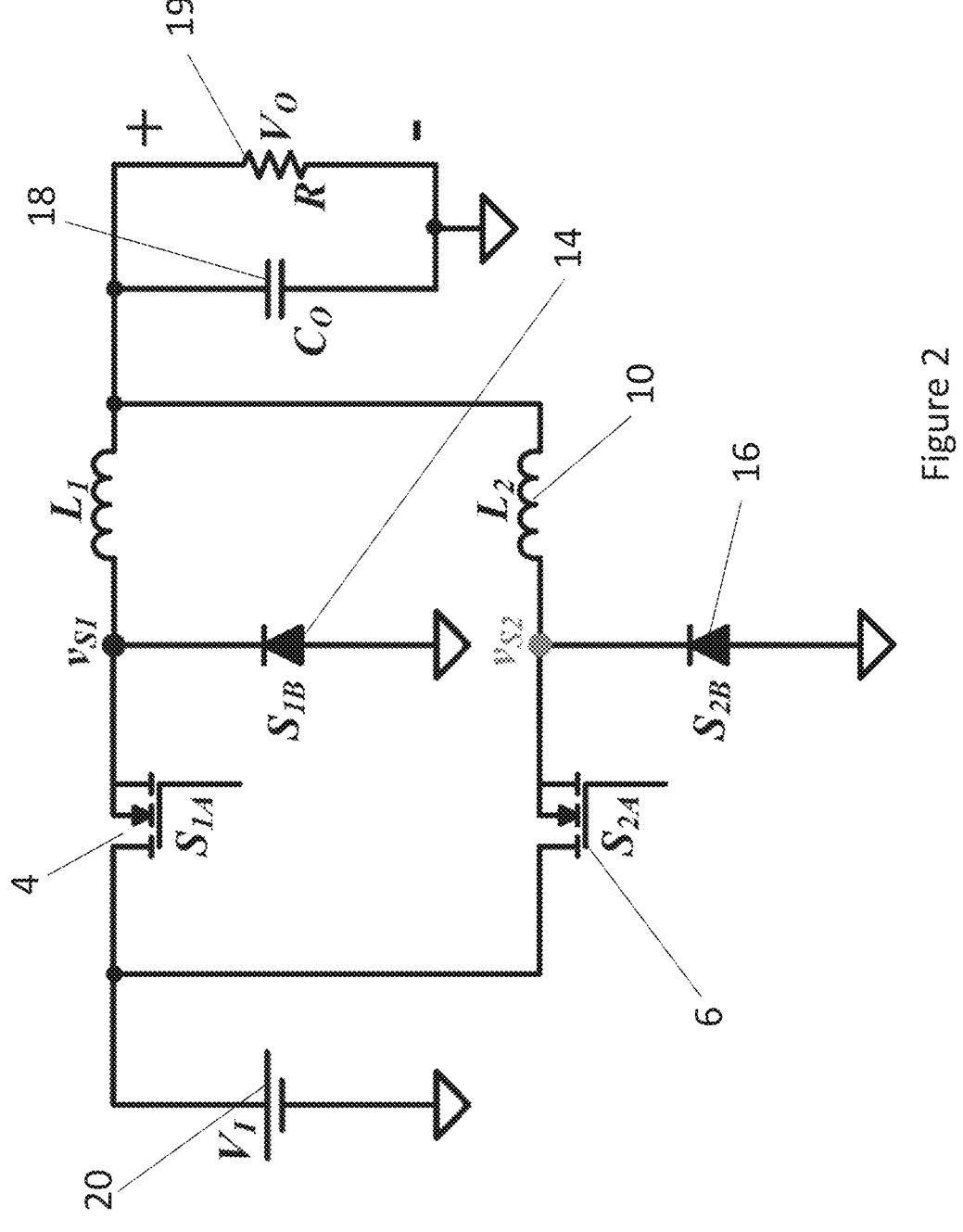
FIG. 2 shows a schematic diagram of a conventional two-phase buck converter.

FIG. 2 shows a schematic diagram of a conventional two-phase buck converter.

Figure 3:
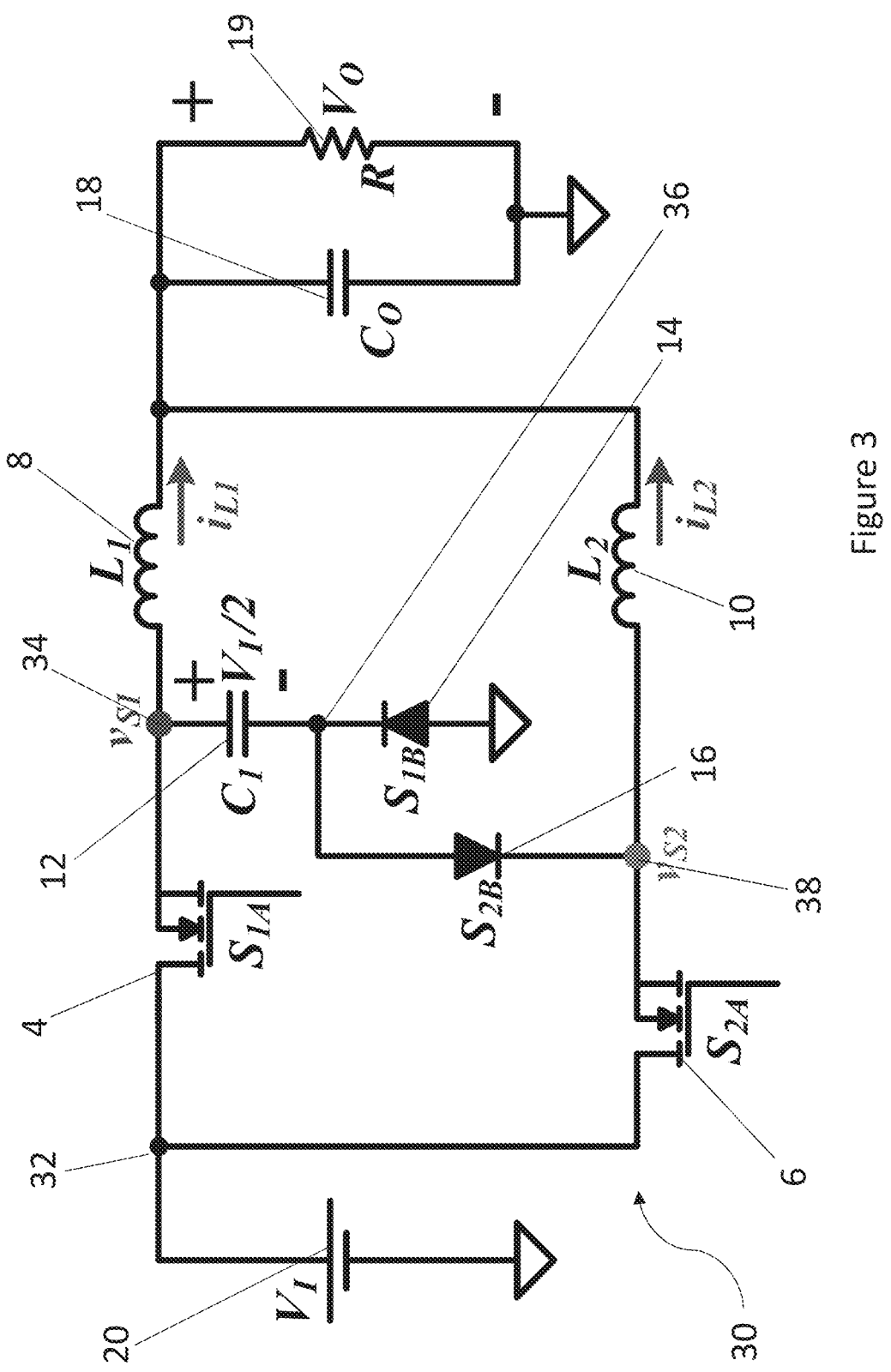
FIG. 3 shows a diagram of a two-phase (N=2) parallel-capacitor buck converter.

FIG. 3 shows a schematic diagram of a parallel-capacitor buck converter 30. The parallel-capacitor buck converter 30 is based on the topology of a conventional two-phase buck converter as shown in FIG. 2, adding an extra capacitor (a switched capacitor C1) with respect to the conventional two-phase buck converter. As can be seen from a comparison of FIG. 1 and FIG. 3, although the components are similar, the topology of the parallel-capacitor buck converter 30 of FIG. 3 is different. In particular, a junction point 32 is present between the voltage source 20 and the switch S1A 4. This junction point 32 connects to the output stage via inductor L2 10.

Further, a junction point (switching node) 34 is present between the first switch S1A 4 and the first inductor L1 8. This junction point 34 connects to ground via the switched capacitor C1 12, and the first output diode rectifier S1B 14. A further junction point 36 is also present between the switched capacitor C1 12, and the first output diode rectifier S1B 14 which connects to a junction point 38 (switching node) via the second output diode rectifier S2B 16. The junction point 38 is provided between the second switch S2A 6, and the second inductor L2 10. The voltage at the switching nodes 34, 38 is vs1 and vs2 respectively.

The result of these differences, is that the converter 2 shown in FIG. 1 is a series-capacitor buck converter, while the converter 30 shown in FIG. 3 is a parallel-capacitor buck converter.

Defining N as the number of phases of the power converter, N=2 for the converter 30 of FIG. 3.

In an example, the constraints governing operation of an N-phase parallel-capacitor buck converter are:

Output voltage: $V_0 = (N - 1 + d) \cdot V_I/N$.
Minimum duty cycle: $d_{Min} = (N - 1)/N$
Maximum duty cycle: $d_{Max} = 1$
Minimum conversion ratio: $m_{Min} = (N^2 - 1)/N^2$
Maximum conversion ratio: $m_{Max} = 1$.

As such, in an example, the constraints governing the usage of the two-phase parallel-capacitor buck converter 30 are:

---

Output voltage: $V_O = (1 + d) \cdot V_I/2$.
Minimum duty cycle: $d_{Min} = 0.5$
Maximum duty cycle: $d_{Max} = 1$
Minimum conversion ratio: $m_{Min} = 0.75$
Maximum conversion ratio: $m_{Max} = 1$.

---

The operation of the converter 30 of FIG. 3 will now be explained with reference to FIGS. 4 to 7.

Figure 4:
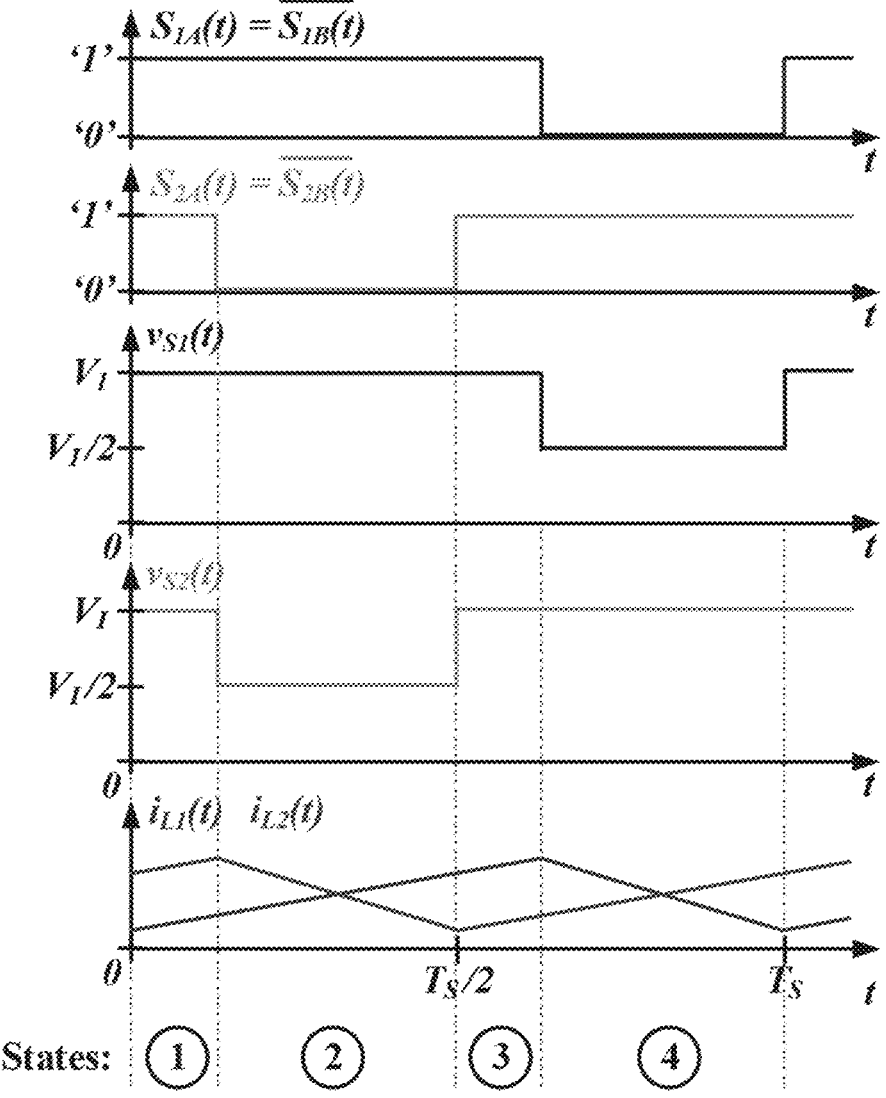
FIG. 4 shows the main voltage and current waveforms of the components of the two-phase (N=2) parallel-capacitor buck converter of FIG. 3 in its states 1-4.

FIG. 4 shows the main voltage and current waveforms in the four states (1, 2, 3, 4) of the switching cycle.

The states are described below:

State 1: S1A and S2A are on (S1B and S2B are off).

Figure 5:
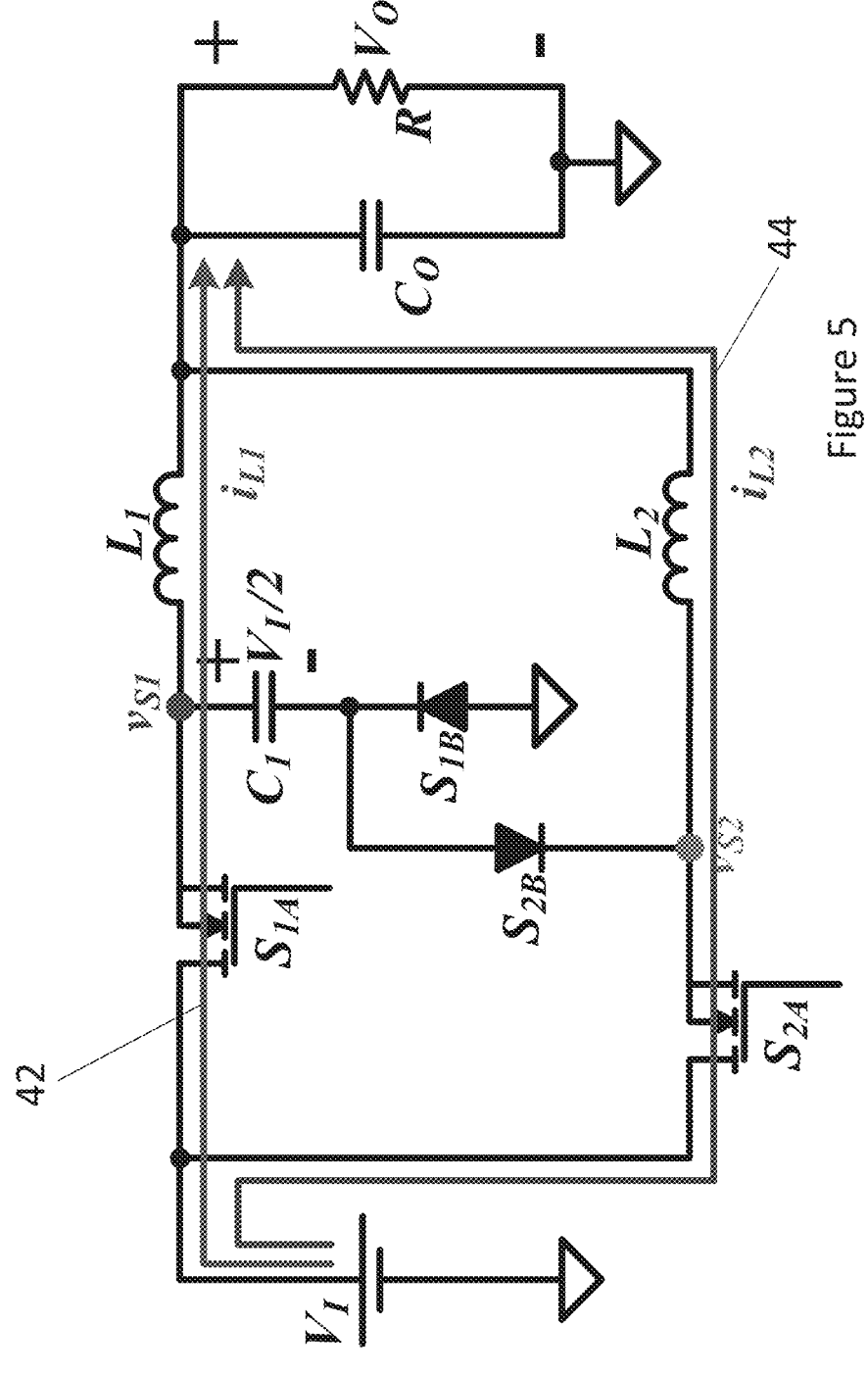
FIG. 5 shows the parallel-capacitor buck converter of FIG. 3 in state 1 and in state 3.

It can be seen in FIG. 5 that the current flows along the arrow 42 (through S1A and L1) and along the arrow 44 (through S2A and L2). Therefore, in State 1, L1 and L2 are charged and store energy, while C1 is disconnected. The switching-node voltages (vS1 and vS2) are equal to VI.

State 2: S1A and S2B are on (S1B and S2A are off).

Figure 6:
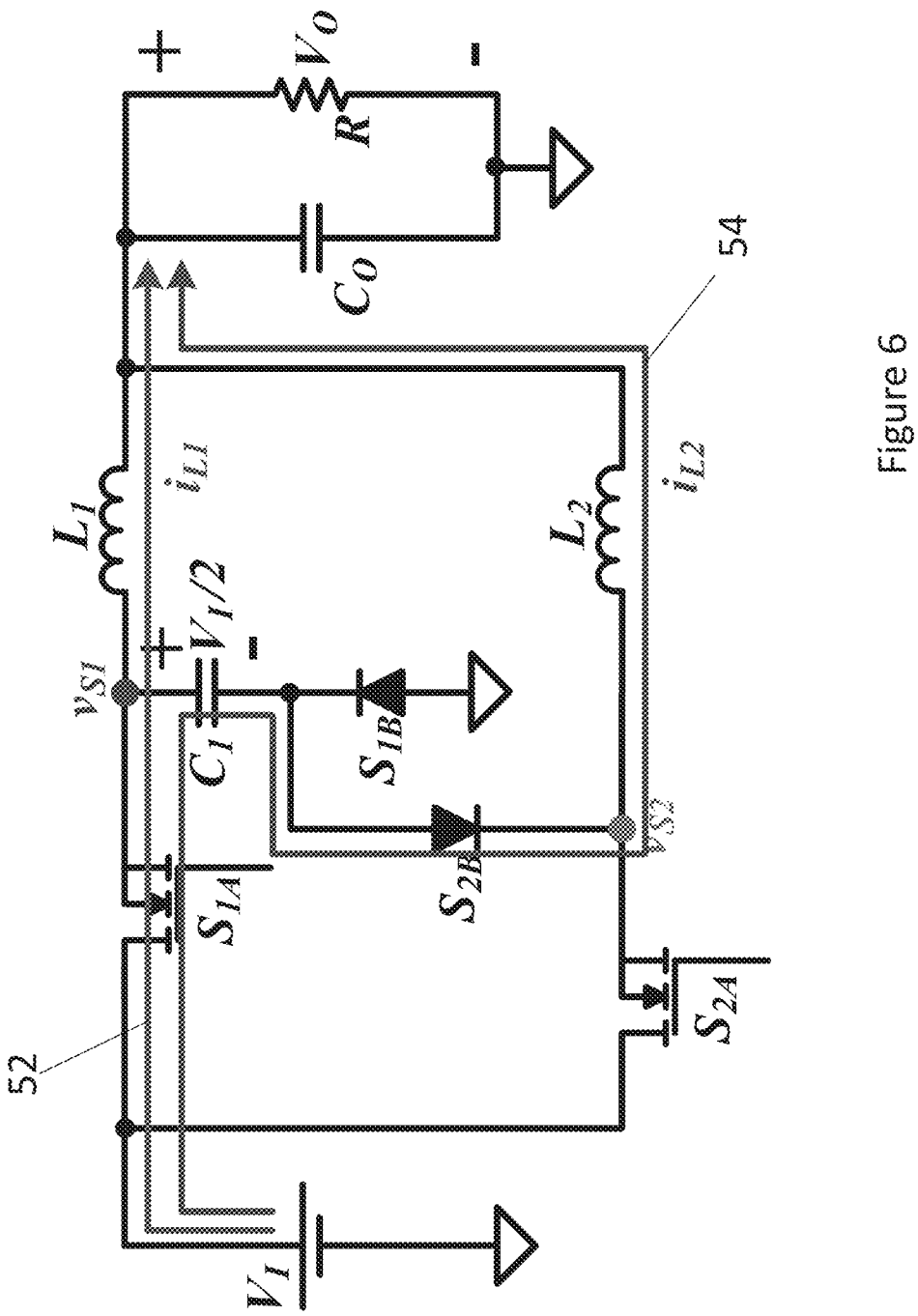
FIG. 6 shows the parallel-capacitor buck converter of FIG. 3 in state 2.

It can be seen in FIG. 6 that current flows along the arrow 52 (through S1A and L1) and along the arrow 54 (through S1A, C1, S2B, and L2). As such, L1 and C1 are charged and store energy, while L2 discharges and delivers energy. vS1 is equal to VI and vS2 is equal to VI/2.

State 3: State 3 is equal to State 1, and as such is also shown in FIG. 5. In State 3, current flows along the arrow 42 (through SA and L1) and along the arrow 44 (through S2A and L2). Therefore, in State 3, L1 and L2 are charged and store energy, while C1 is disconnected. The switching-node voltages (vS1 and vS2) are equal to VI.

State 4: S1B and S2A are on (S1A and S2B are off).

Figure 7:
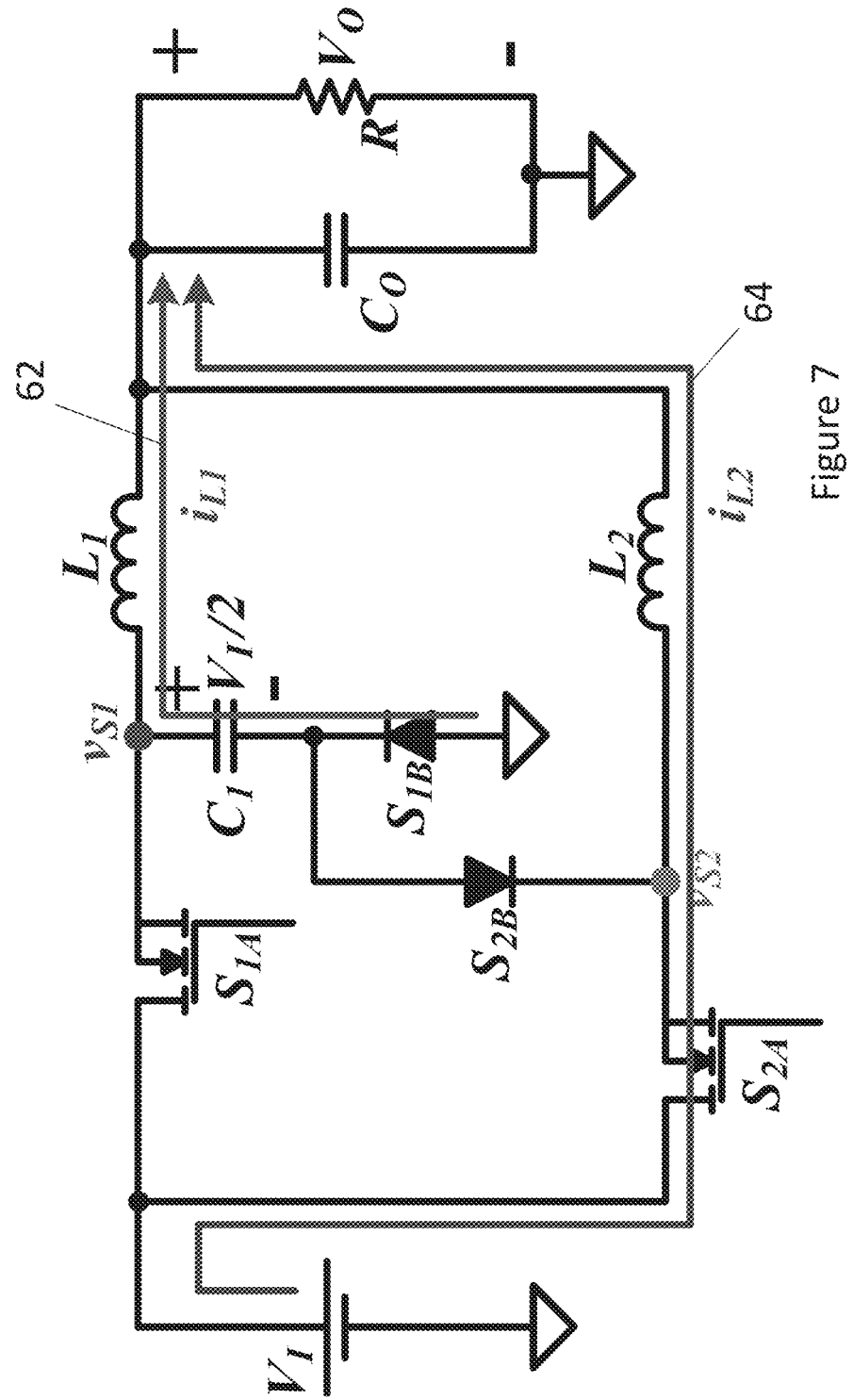
FIG. 7 shows the parallel-capacitor buck converter of FIG. 3 in state 4.

It can be seen in FIG. 7 that current flows along the arrow 62 (through S1B, C1, and L1) and along the arrow 64 (through S2A, and L2). In State 4, L1 and C1 discharge and deliver energy, while L2 is charged and stores energy. vS1 is equal to VI/2 and vS2 is equal to VI.

Using the operating principle described above, the output voltage (VO) can be linearly controlled by means of the duty cycle (d): VO=(1+d). VI/2.

Figures 8, 9, 10:
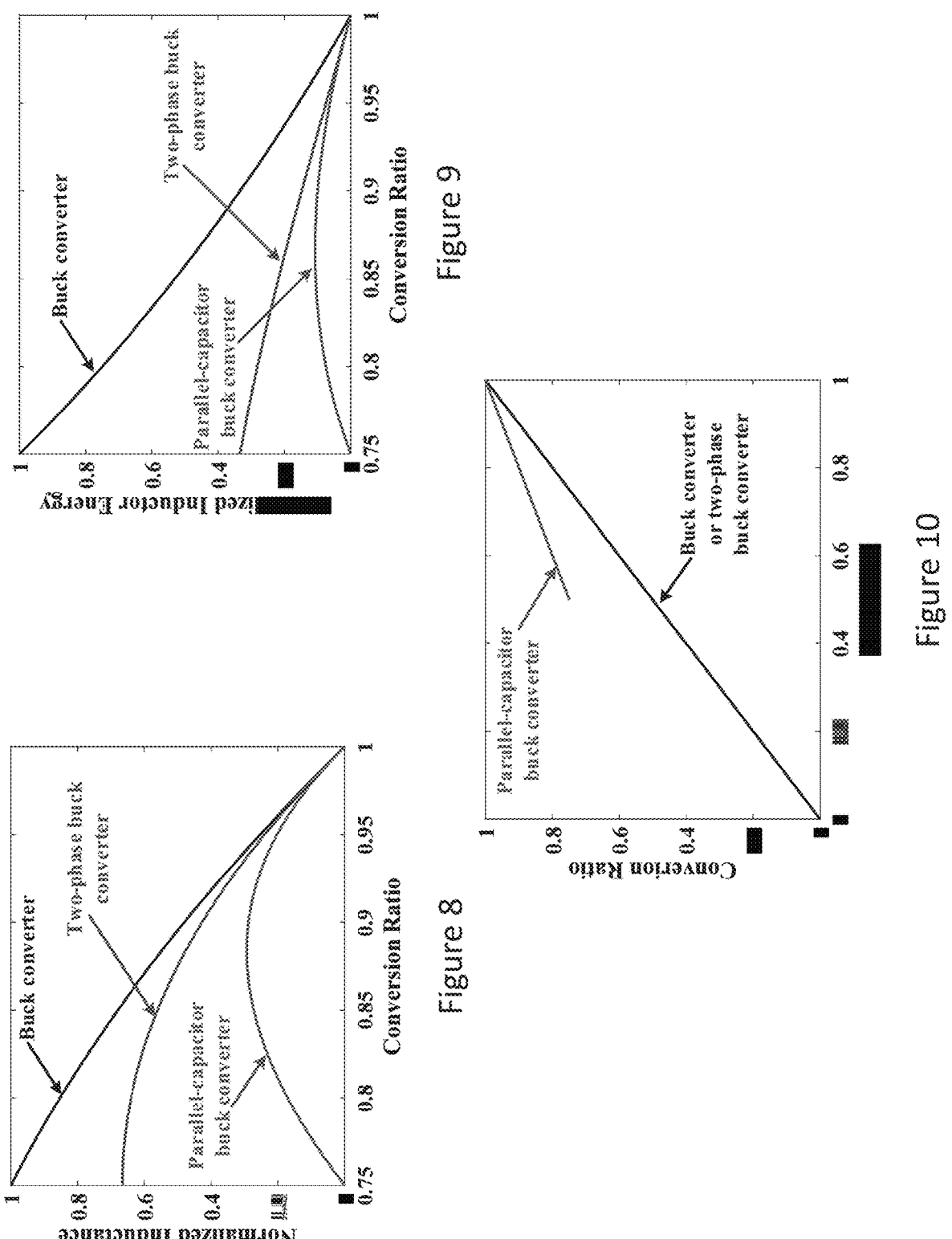
FIG. 8 shows a plot of normalised inductance against conversion ratio for a buck converter, the two-phase buck converter of FIG. 2, and the parallel-capacitor buck converter of FIG. 3.
FIG. 9 shows a plot of normalised inductor energy against conversion ratio for a buck converter, the two-phase buck converter of FIG. 2, and the parallel-capacitor buck converter of FIG. 3.
FIG. 10 shows a plot of conversion ratio against duty cycle for a buck converter or the two-phase buck converter of FIG. 2, and the parallel-capacitor buck converter of FIG. 3.

FIGS. 8, 9 and 10 demonstrate the benefits of the parallel-capacitor buck converter 30, compared to conventional buck converters and two-phase buck converters.

FIG. 8 shows normalised inductance plotted against conversion ratio. It can be seen that the parallel-capacitor buck converter 30 has lower inductance than both the buck converter and the two-phase buck converter over the plotted conversion ratio range.

Further, FIG. 9 shows normalised inductor energy plotted against conversion ratio. Similarly to the data of FIG. 8, FIG. 9 shows that the parallel-capacitor buck converter has lower total energy stored by inductors than both the buck converter and the two-phase buck converter over the entire plotted conversion ratio range.

In general, the magnetic inductor components are the largest and heaviest of power converters and so, by using a topology that reduces the amount of energy needing to be stored by inductors, the size and weight of the power converter as a whole may be reduced.

FIG. 10 shows the conversion ratio plotted against the duty cycle. As demonstrated by FIG. 10, a drawback of the parallel-capacitor buck converter is that the duty cycle must be greater than or equal to 0.5. However, FIG. 10 shows (via the difference in the gradients of the two lines) that, with the parallel-capacitor buck converter, the same duty cycle change results in a lower output voltage change than a conventional buck converter or a two-phase buck converter. Therefore, the desired output voltage level may be provided with higher accuracy using a parallel-capacitor buck converter.

Figure 11:
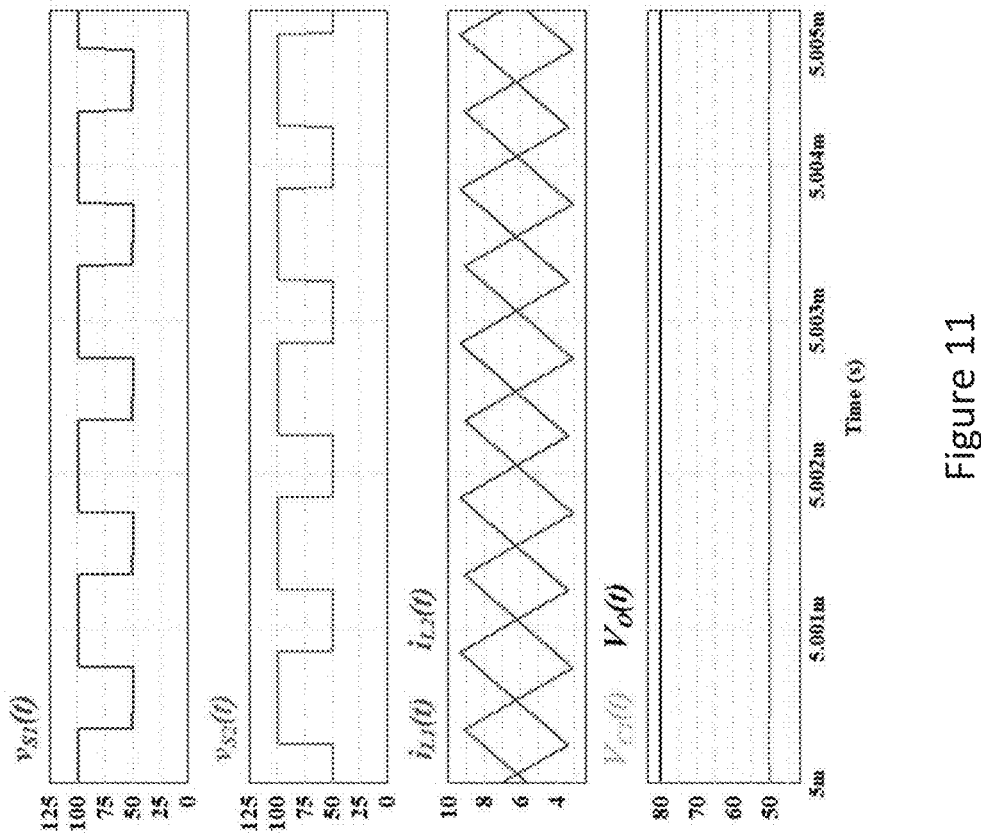
FIG. 11 shows main voltage and current waveforms of a simulated parallel-capacitor buck converter.

FIG. 11 shows a simulation of operation of a parallel-capacitor buck converter, using an electronic circuit simulation software package, PSIM. The converter specifications for the simulation were as follows:

---

Input voltage = 100 V
Output voltage = 80 V (duty cycle = 0.6)
Output power = 1 kW
Switching frequency = 1 MHz.

---

It is important to note that no active control has been implemented to regulate the voltage across the capacitor and the phase currents, which, as FIG. 11 shows, are naturally balanced.

Figure 12:
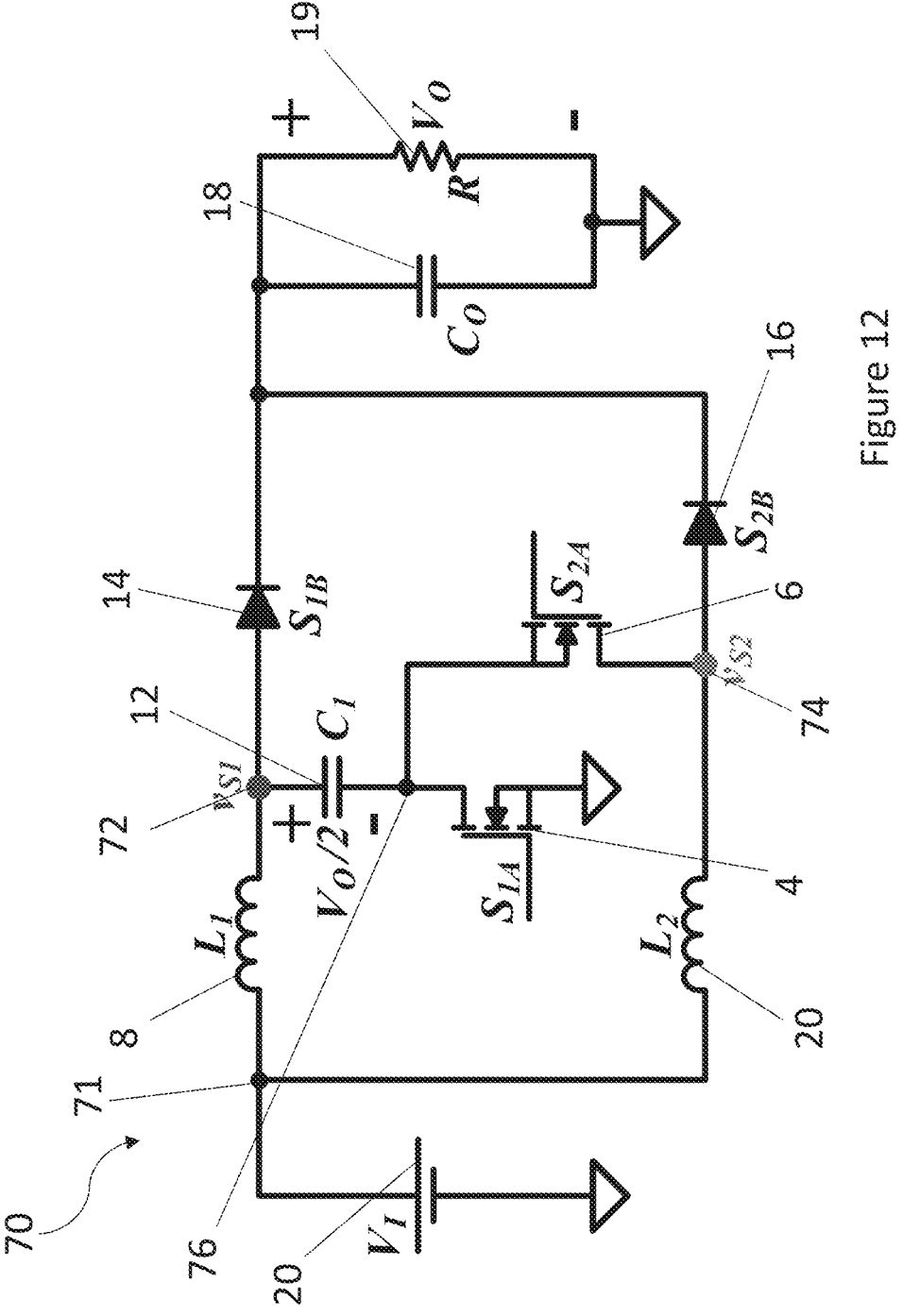
FIG. 12 shows a diagram of a two-phase (N=2) parallel-capacitor boost converter.

FIG. 12 shows a schematic diagram of a parallel-capacitor boost converter 70. The parallel-capacitor boost converter 70 shown in FIG. 12 is based on the parallel-capacitor buck converter 30 shown in FIG. 3, and comprises the same components as the parallel-capacitor buck converter 30, but with a slightly different topology, as can be seen from a comparison of FIGS. 3 and 12.

In the parallel-capacitor buck converter 30 shown in FIG. 3, the inductors L1 8 and L2 10 are provided on the output side of the switched capacitor C1 12, whereas, in the parallel-capacitor boost converter 70 shown in FIG. 12, the inductors L1 8 and L2 10 are provided on the input side of the switched capacitor C1 12.

In FIG. 12, the input stage (comprising the voltage source 20) is connected to the output state (comprising the output capacitor CO 18 and a load R 19) via two branches which split at junction point 71. The first branch comprises the inductor L1 8, the output diode rectifier S1B 14, and a junction point (switching-node) 72 provided between the inductor L1 8 and the output diode rectifier S1B 14. The second branch comprises the inductor L2 10, the output diode rectifier S2B 16, and a junction point (switching-node) 74 provided between the inductor L2 10 and the output diode rectifier S2B 16.

The junction point 72 on the first branch and the junction point 74 on the second branch are connected. The junction point 72 connects to ground via the switched capacitor C1 12 and the switch S1A 4. A further junction point 76 is also present between the switched capacitor C1 12 and the switch S1A 4, which connects to the junction point 74 via the switch S2A 6.

The parallel-capacitor boost converter 70 of FIG. 12 is capable of achieving a conversion ratio between 1 and 1.33.

In an example, the constraints governing operation of an N-phase parallel-capacitor boost converter are:

---

Output voltage: $V_O = V_I/[1 - (d/N)]$
Minimum duty cycle: $d_{Min} = 0$
Maximum duty cycle: $d_{Max} = 1/N$
Minimum conversion ratio: $m_{Min} = 1$
Maximum conversion ratio: $m_{Max} = N^2/(N^2 - 1)$.

---

As such, in an example, the constraints governing the usage of the two-phase parallel-capacitor buck converter 70 are:

Output voltage: $V_O = V_I/[1 - (d/2)]$
Minimum duty cycle: $d_{Min} = 0$
Maximum duty cycle: $d_{Max} = 0.5$
Minimum conversion ratio: $m_{Min} = 1$
Maximum conversion ratio: $m_{Max} = 4/3 = 1.33$.

Figure 13:
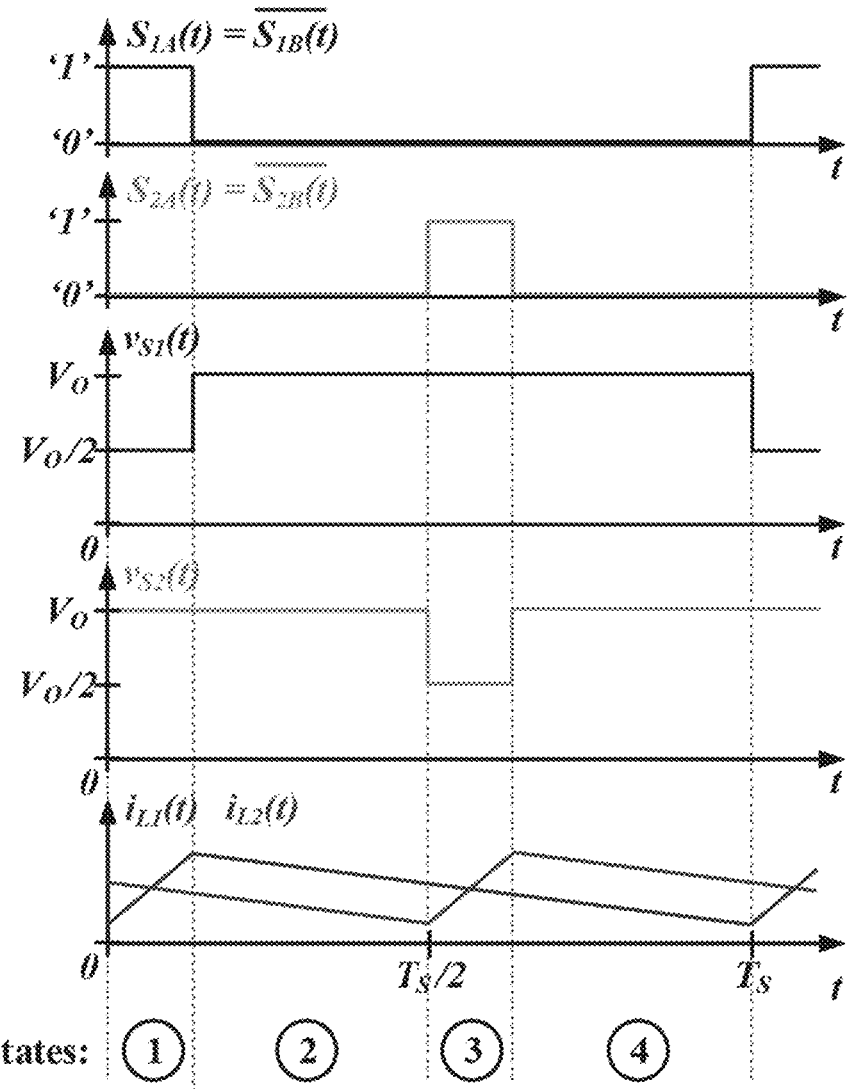
FIG. 13 shows the main voltage and current waveforms of the components of the two-phase (N=2) parallel-capacitor boost converter of FIG. 12 in its states 1-4.

FIG. 13 shows the main voltage and current waveforms in the four states (1, 2, 3, 4) of the switching cycle.

The states are described below:

State 1: S1A and S2B are on (S1B and S2A are off).

Figure 14:
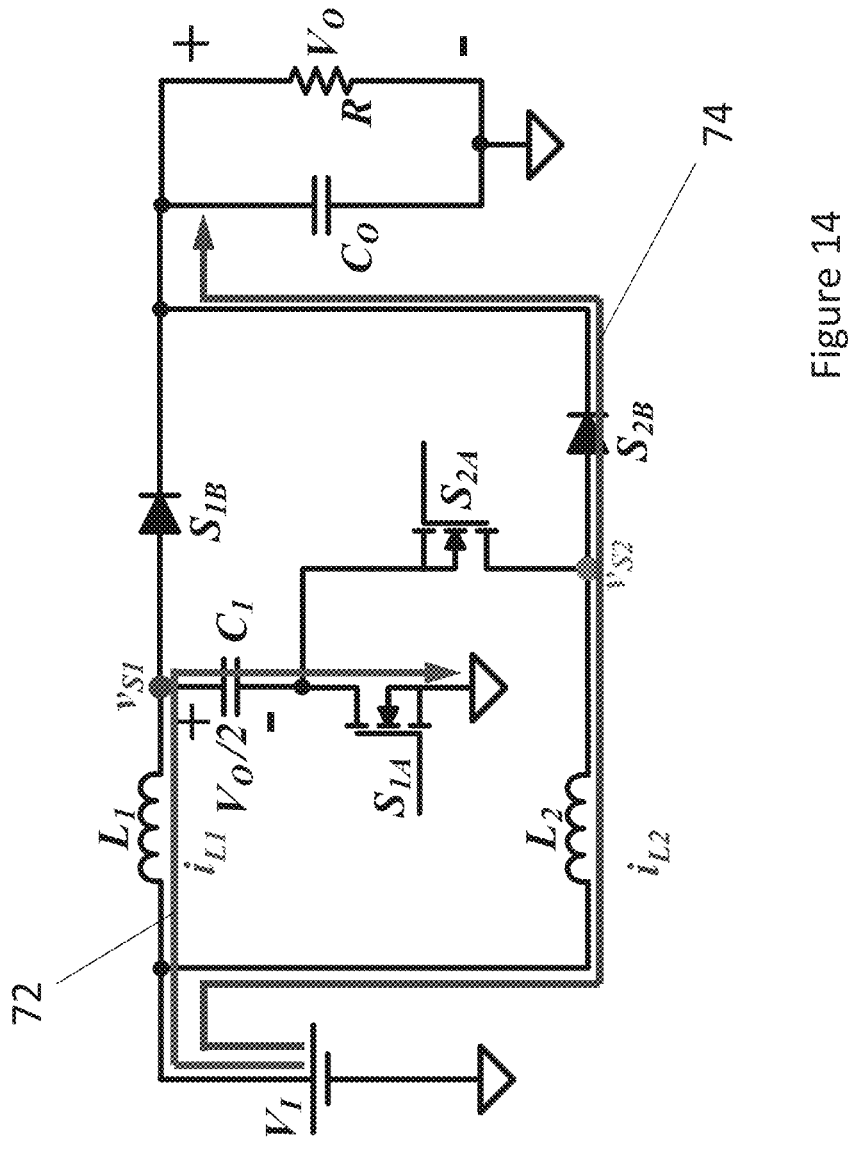
FIG. 14 shows the parallel-capacitor boost converter of FIG. 12 in state 1.

It can be seen in FIG. 14 that the current flows along the arrow 72 (through L1, C1 and S1A) and along the arrow 74 (through L2 and S2B). Therefore, in State 1, L1 and C1 L2 are charged and store energy, while L2 is discharged and delivers energy. The switching-node voltages (vS1 and vS2) are equal to VO/2 and VO, respectively.

State 2: S1B and S2B are on (S1A and S2A are off).

Figure 15:
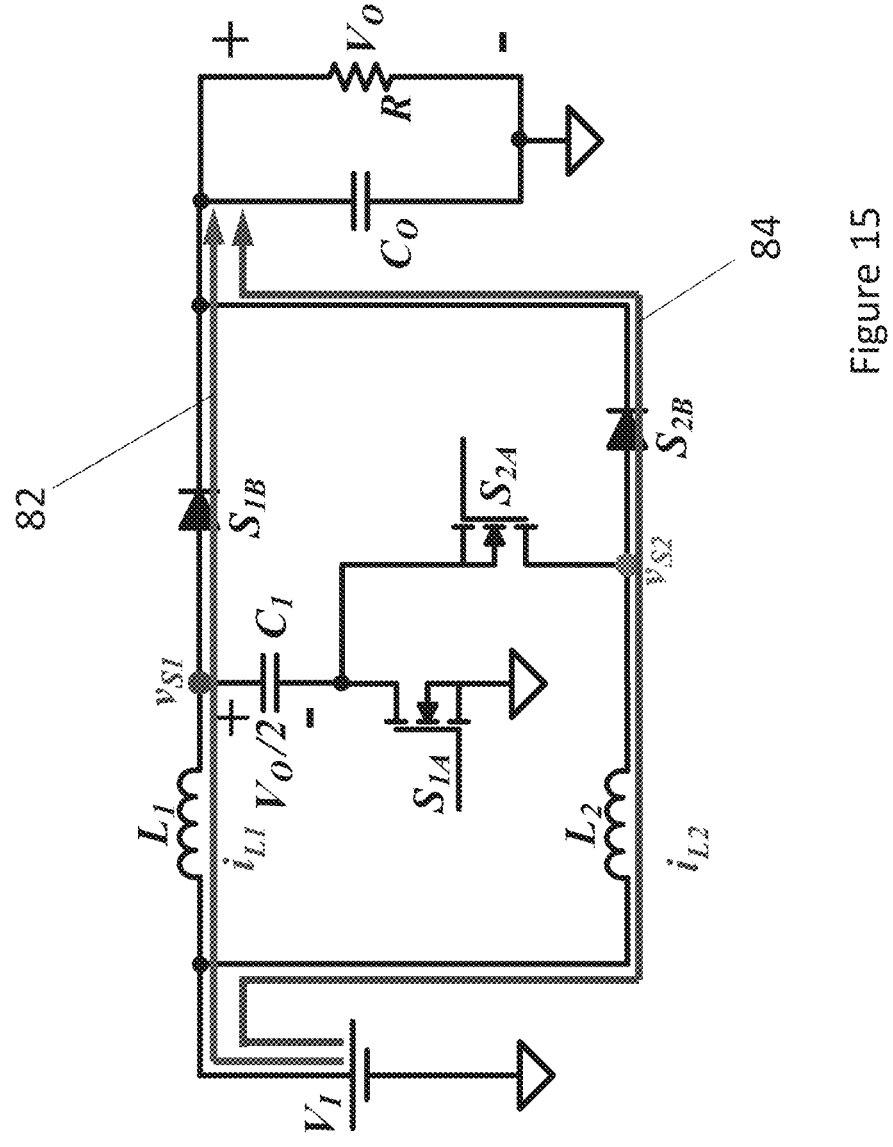
FIG. 15 shows the parallel-capacitor boost converter of FIG. 12 in state 2 and in state 4.

It can be seen in FIG. 15 that the current flows along the arrow 82 (through L1 and S1B) and along the arrow 84 (through L2 and S2B). As such, L1 and L2 are discharged and deliver energy, while C1 is disconnected. vS1 and vS2 are equal to VO.

State 3: S1B and S2A are on (S1A and S2B are off).

Figure 16:
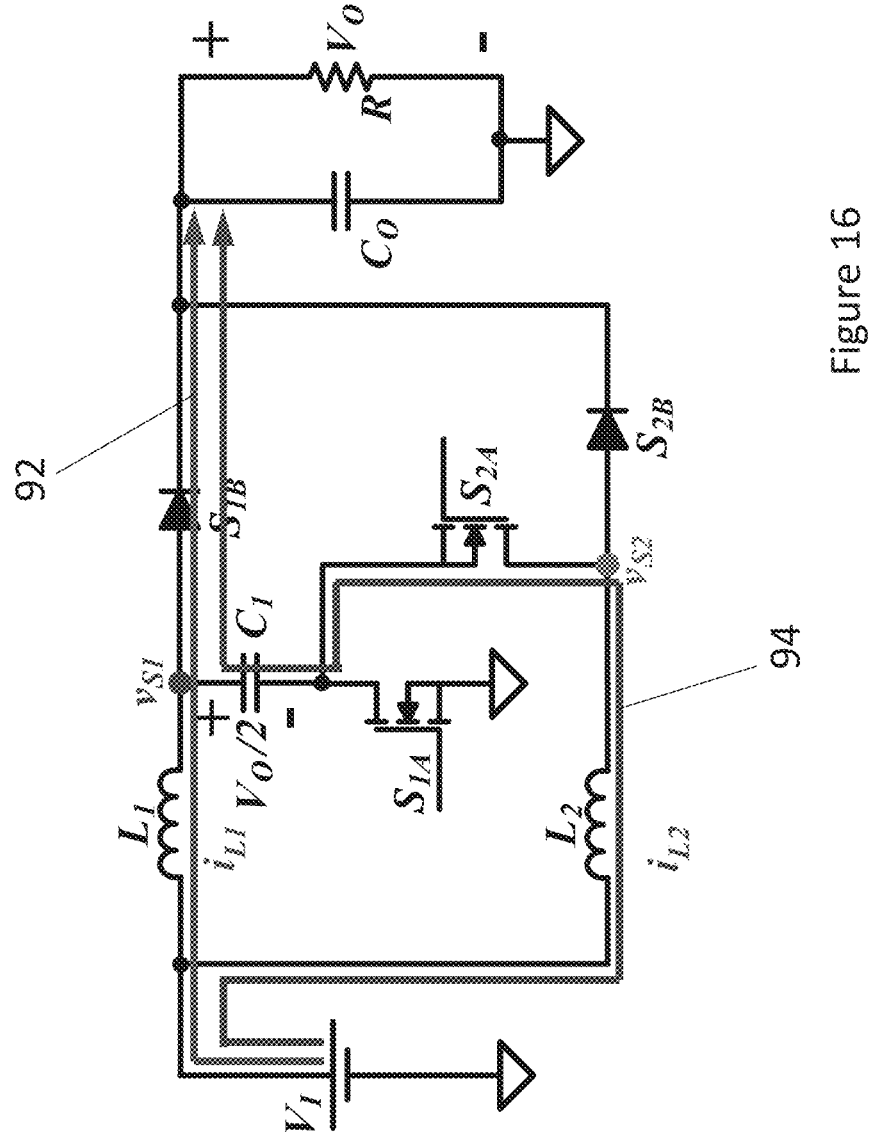
FIG. 16 shows the parallel-capacitor boost converter of FIG. 12 in state 3.

It can be seen in FIG. 16 that the current flows along the arrow 92 (through L1 and S1B) and along arrow 94 (through L2, S2A, C1 and S1B). Therefore, in State 3, L1 and C1 are discharged and deliver energy, while L2 is charged and stores energy. vS1 and vS2 are equal to VO and VO/2, respectively.

State 4: State 4 is equal to State 2.

Figure 17:
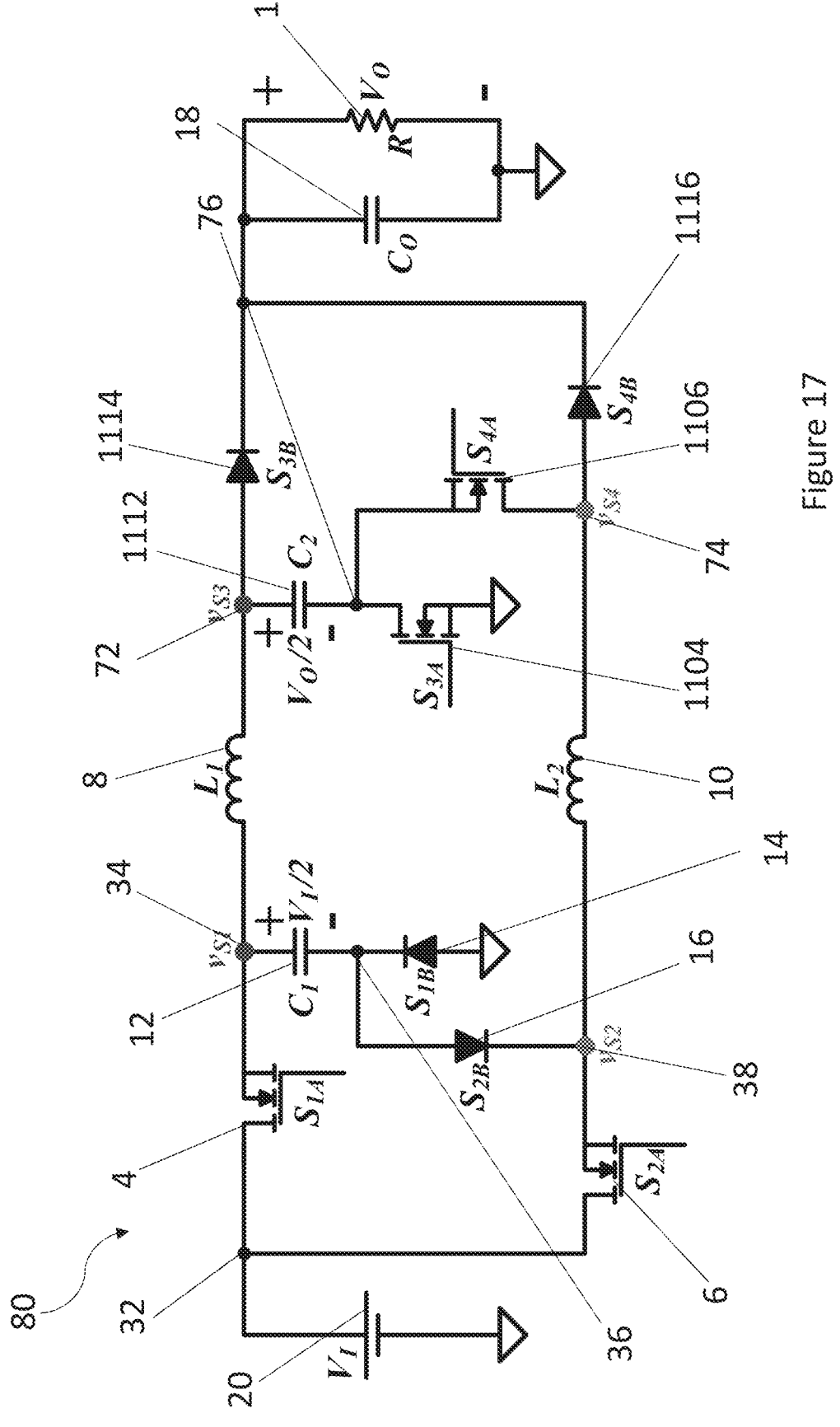
FIG. 17 shows a diagram of a parallel-capacitor buck-boost converter.

FIG. 17 shows a parallel-capacitor buck-boost converter 80. This converter 80 is both a step-up and a step-down converter.

The parallel-capacitor buck-boost converter 80 comprises a pair of inductors L1 8, and L2 10. The parallel-capacitor buck-boost converter 80 is a combination of the parallel-capacitor buck converter 30 of FIG. 3, and the parallel-capacitor boost converter 70 of FIG. 12, with two capacitors 12, 1112 arranged between the first and second branches of the circuit element either side of the two inductors 8, 10.

As can be seen from FIG. 17, on the input side of the inductors 8, 10, the circuit is arranged in the same way as the parallel-capacitor buck converter 30. Meanwhile, on the output side of the inductors, the circuit is arranged in the same way as the parallel-capacitor boost converter 70 and comprises the second switched capacitor C2 1112, the third switch S3A 1104, the fourth switch S4A 1106, the third diode rectifier S3B 1114 and the fourth diode rectifier S4B 1116.

Since the parallel-capacitor buck converter 30 has a conversion ratio range between 0.75 and 1, and the parallel-capacitor boost converter 70 has a conversion ratio range between 1 and 1.33, this combined buck-boost converter 80 has a continuous conversion ratio range, between 0.75 and 1.33. Such a continuous conversion ratio range would not be possible using a buck-boost converter derived from a conventional series-capacitor buck-converter since this has a conversion ratio range between 0 and 0.25.

The topology described above can also be adapted to create power converters having a higher number of phases. Power converters having a higher number of phases help to reduce the total energy stored by inductors (thus helping to reduce the size of the inventors), and help to increase the accuracy of the desired output voltage.

Figure 18:
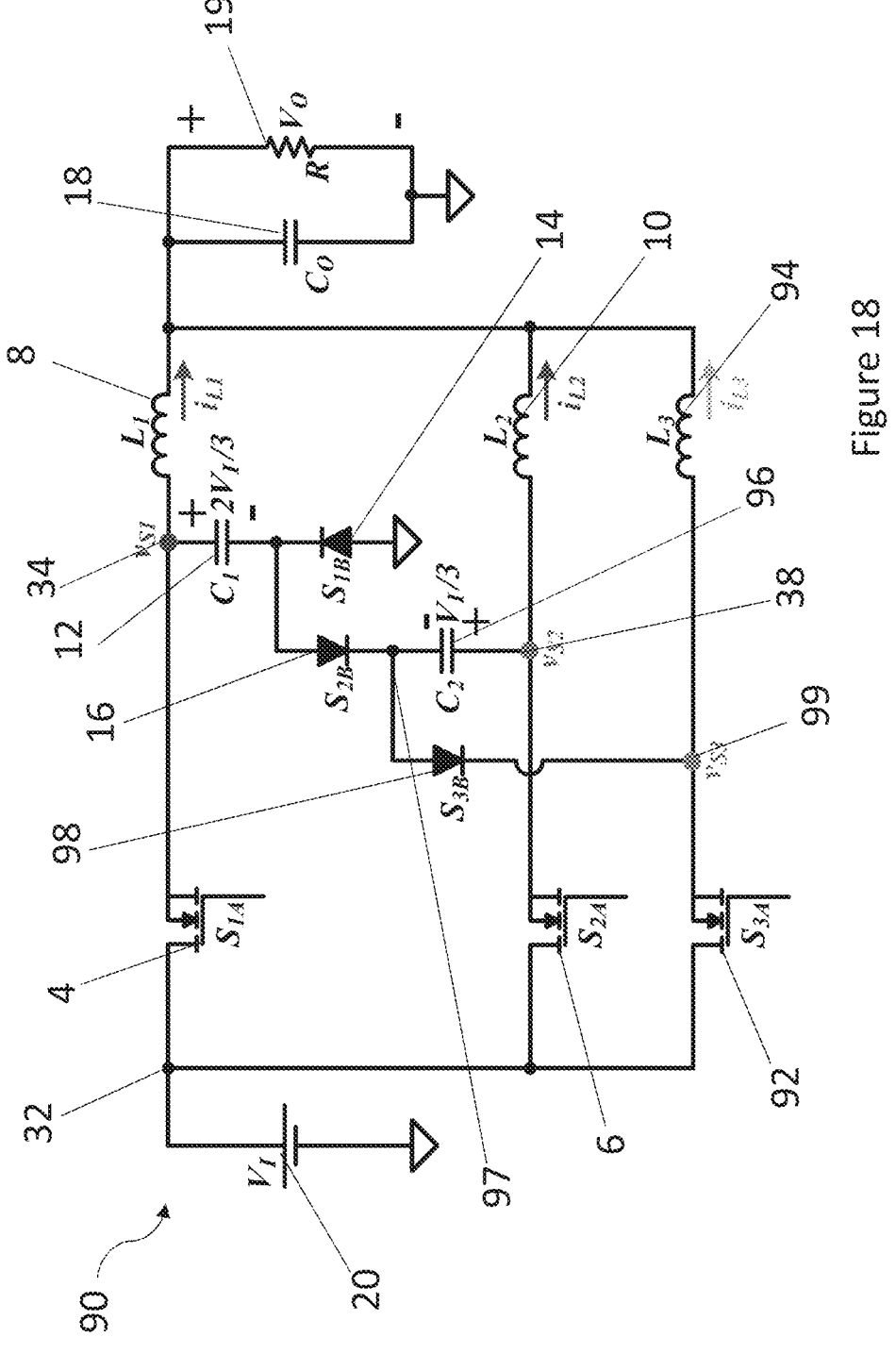
FIG. 18 shows a diagram of a three-phase (N=3) parallel-capacitor buck converter.

As an example of this, FIG. 18 shows a three-phase parallel-capacitor buck converter 90.

The three-phase parallel-capacitor buck converter 90 has the same structure as the parallel-capacitor buck converter 30 of FIG. 5, but with an extra branch which includes a third switch S3A 92, and a third inductor L3 94, connected in parallel with the first switch S1A 4, and the first inductor L1 8, and with the second switch S2A 6, and the second inductor L2 10. The three-phase parallel-capacitor buck converter 90 further comprises a second switched capacitor C2 96 which is connected between the second diode rectifier S2B 16, and the junction point (switching node) 38, and a third diode rectifier S3B 98 connected between a junction point 97 (provided between the second diode rectifier S2B 16, and the second switched capacitor C2 96) and a junction point (switching node) 99 (provided between the third switch S3A 92, and the third inductor L3 94).

The three-phase parallel-capacitor buck converter 90 has the same advantages as the parallel-capacitor buck converter 30, notably, reduced weight, natural balancing of the phase currents, and a higher output voltage resolution. The three-phase parallel-capacitor buck converter 90 of FIG. 18 has a conversion ratio range from 0.88 to 1.

The operation of the converter 90 of FIG. 18 will now be explained in detail with reference to FIGS. 20 to 23.

Figure 19:
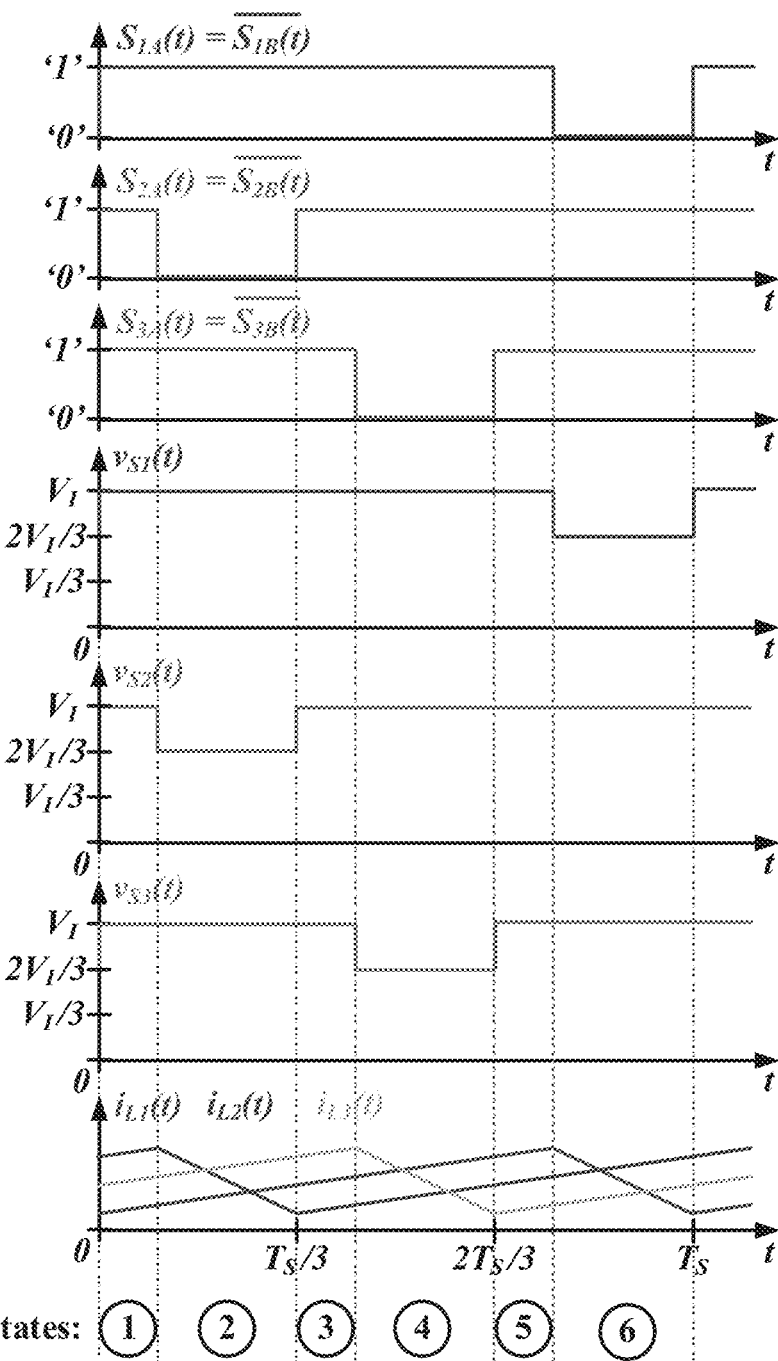
FIG. 19 shows the main voltage and current waveforms of the components of the three-phase (N=3) parallel-capacitor buck converter of FIG. 18 in states 1-6.

FIG. 19 shows the main voltage and current waveforms in the six states (1, 2, 3, 4, 5, 6) of the switching cycle.

The states are described below:

State 1: S1A, S2A, and S3A are on (S1B, S2B and S3B are off).

Figure 20:
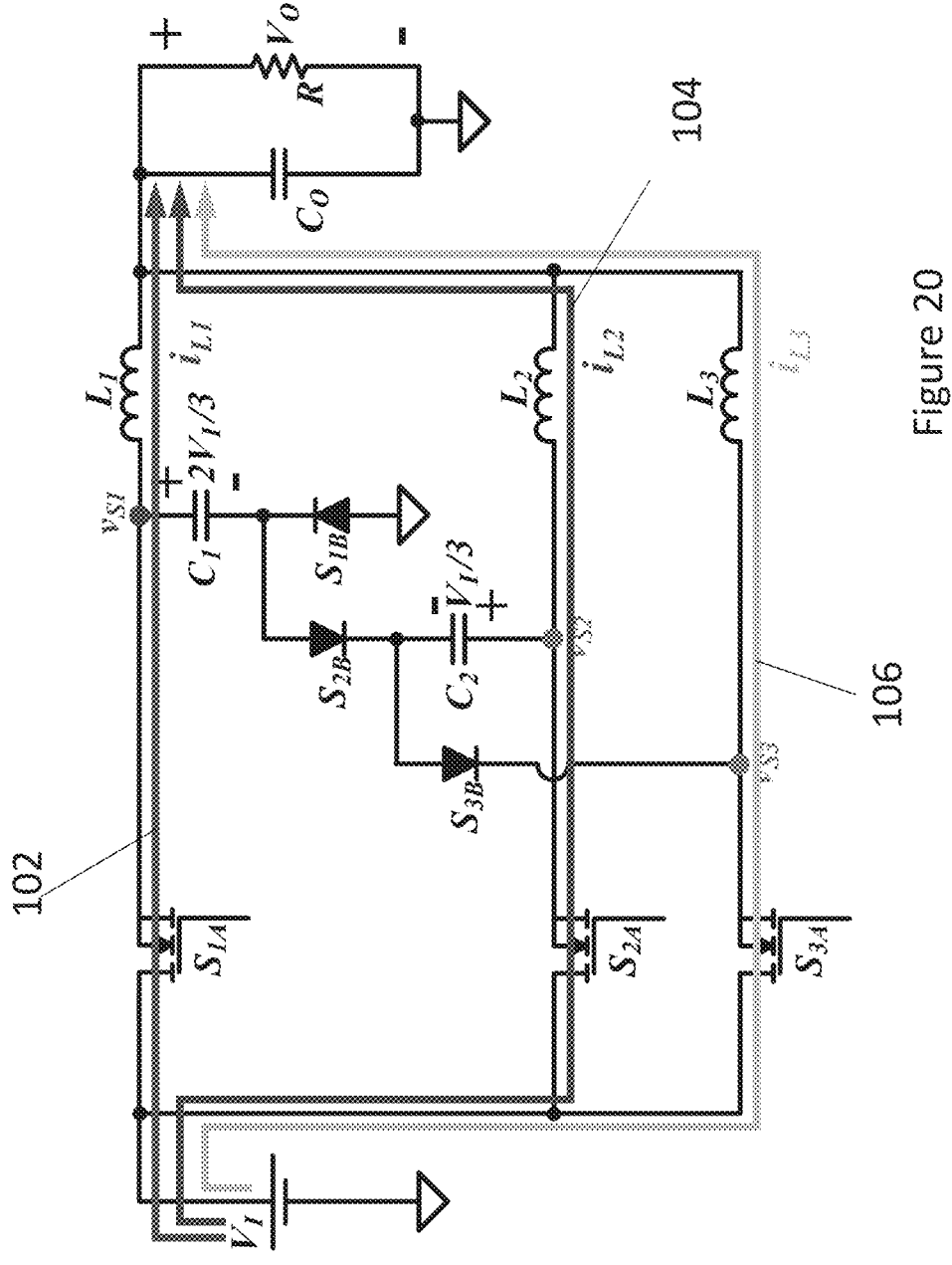
FIG. 20 shows the three-phase parallel-capacitor buck converter of FIG. 18 in state 1, state 3, and state 5.

It can be seen in FIG. 20 that current flows along arrow 102 (through S1A and L1) and along arrow 104 (through S2A and L2) and along arrow 106 (through S3A and L3). Therefore, in State 1, L1, L2 and L3 are charged (store energy), while C1 and C2 are disconnected. The switching-node voltages (vS1, vS2 and vS3) are equal to VI.

State 2: S1A, S3A and S2B are on (S1B, S3B and S2A are off).

Figure 21:
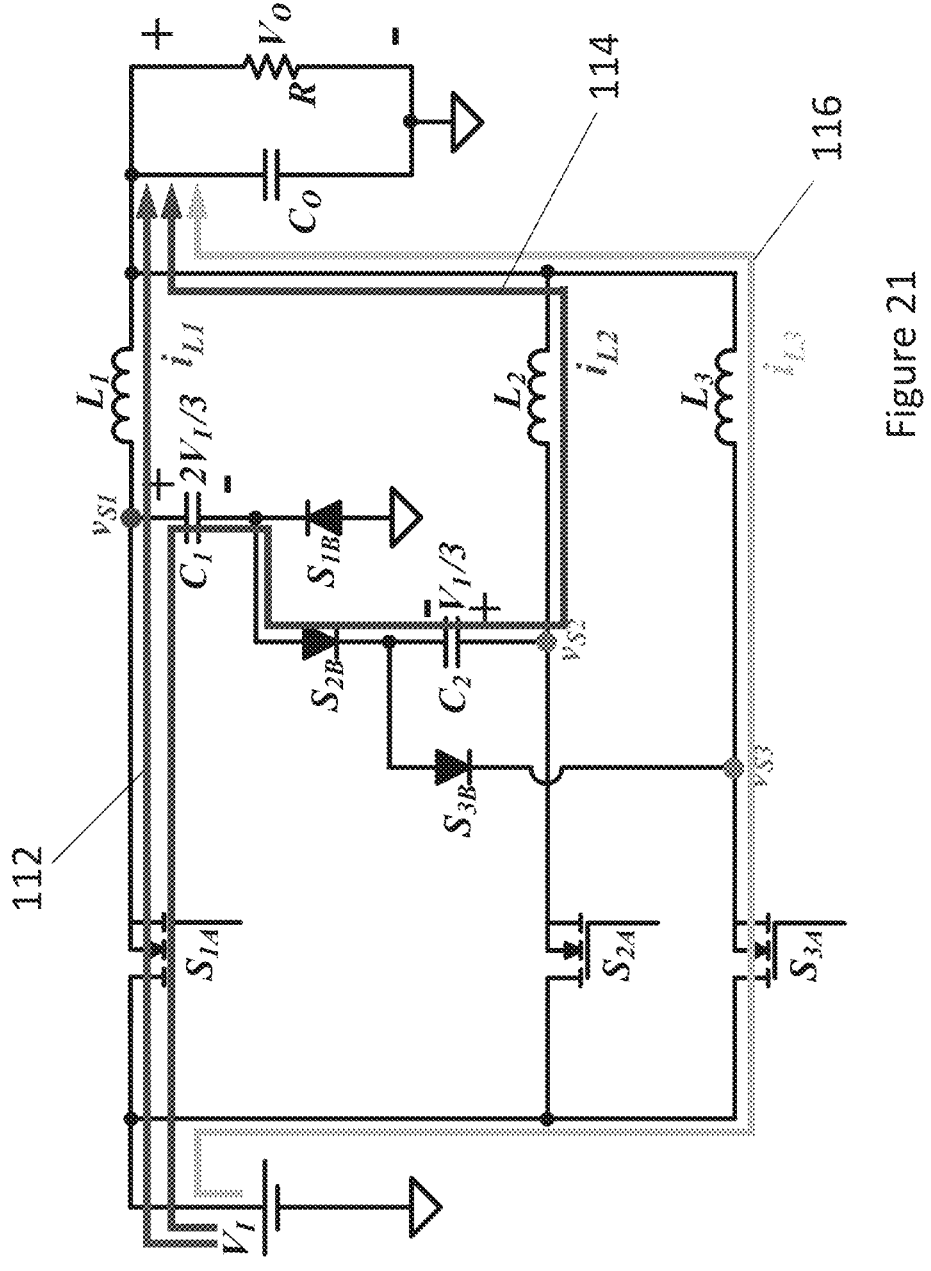
FIG. 21 shows the three-phase parallel-capacitor buck converter of FIG. 18 in state 2.

It can be seen in FIG. 21 that current flows along arrow 112 (through S1A and L1) and along arrow 114 (through S1A, C1, S2B, C2, and L2) and along arrow 116 (through S3A and L3). As such, L1, L3 and C1 are charged (store energy), while L2 and C2 are discharged (deliver energy). vS1 is equal to VI, vS2 is equal to 2VI/3 and vS3 is equal to VI.

State 3: State 3 is equal to State 1, and as such is also shown in FIG. 20, and the accompanying explanation given above.

State 4: S1A, S2A and S3B are on (S3A, S1B and S2B are off).

Figure 22:
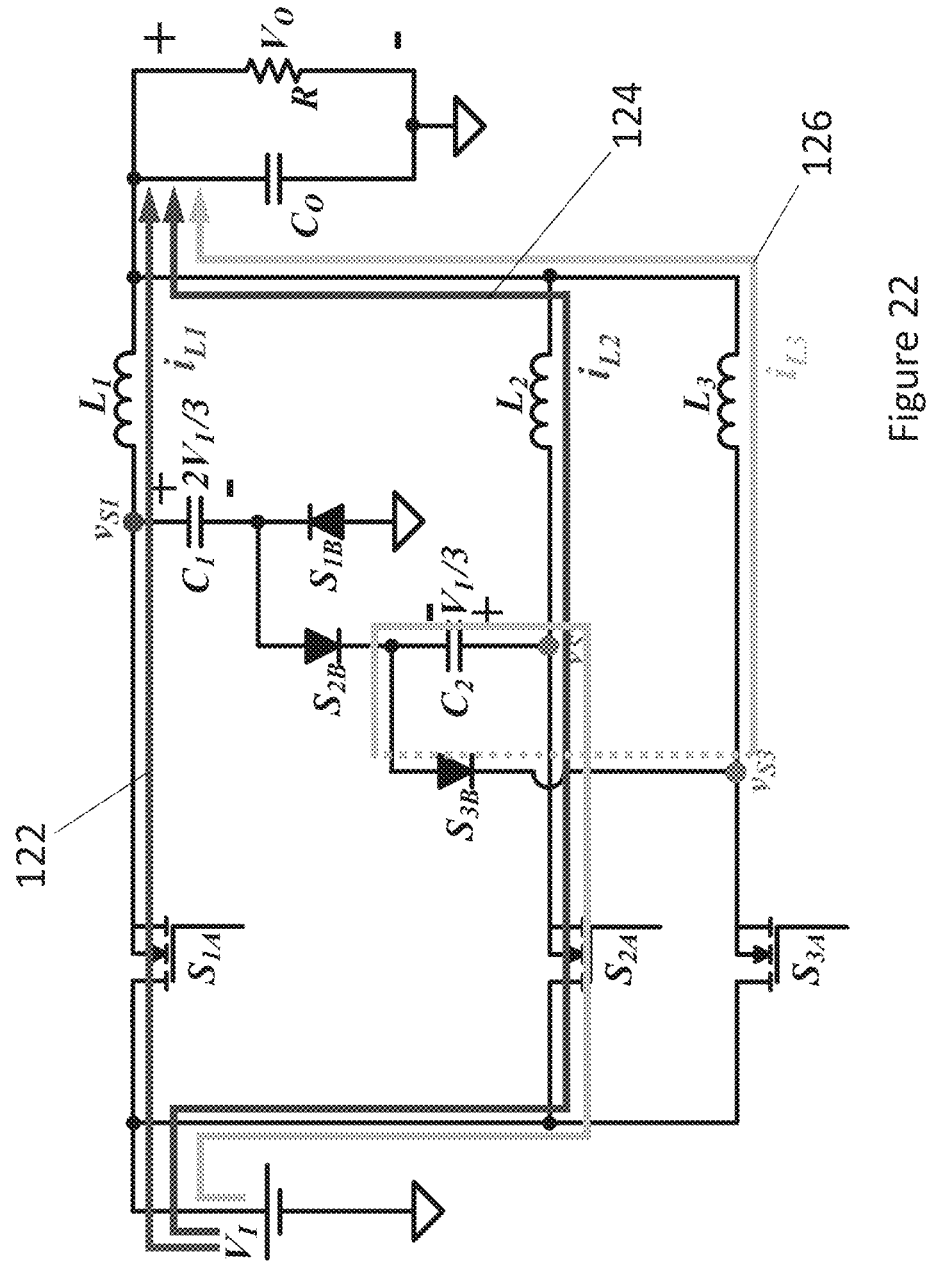
FIG. 22 shows the three-phase parallel-capacitor buck converter of FIG. 18 in state 4.

It can be seen in FIG. 22 that current flows along arrow 122 (through S1A and L1) and along arrow 124 (through S2A, C2, S3B, and L3), and along arrow 126 (through S2A, and L2). In State 4, L1, L2 and C2 are charged (store energy), while L3 is discharged (delivers energy). C1 is disconnected. vS1 is equal to VI, vS2 is equal to VI and vS3 is equal to 2VI/3.

State 5: State 5 is equal to State 1 and state 3, and as such is also shown in FIG. 20, and the accompanying explanation given above.

State 6: S2A, S3A and S1B are on (S1A, S2B and S3B are off).

Figure 23:
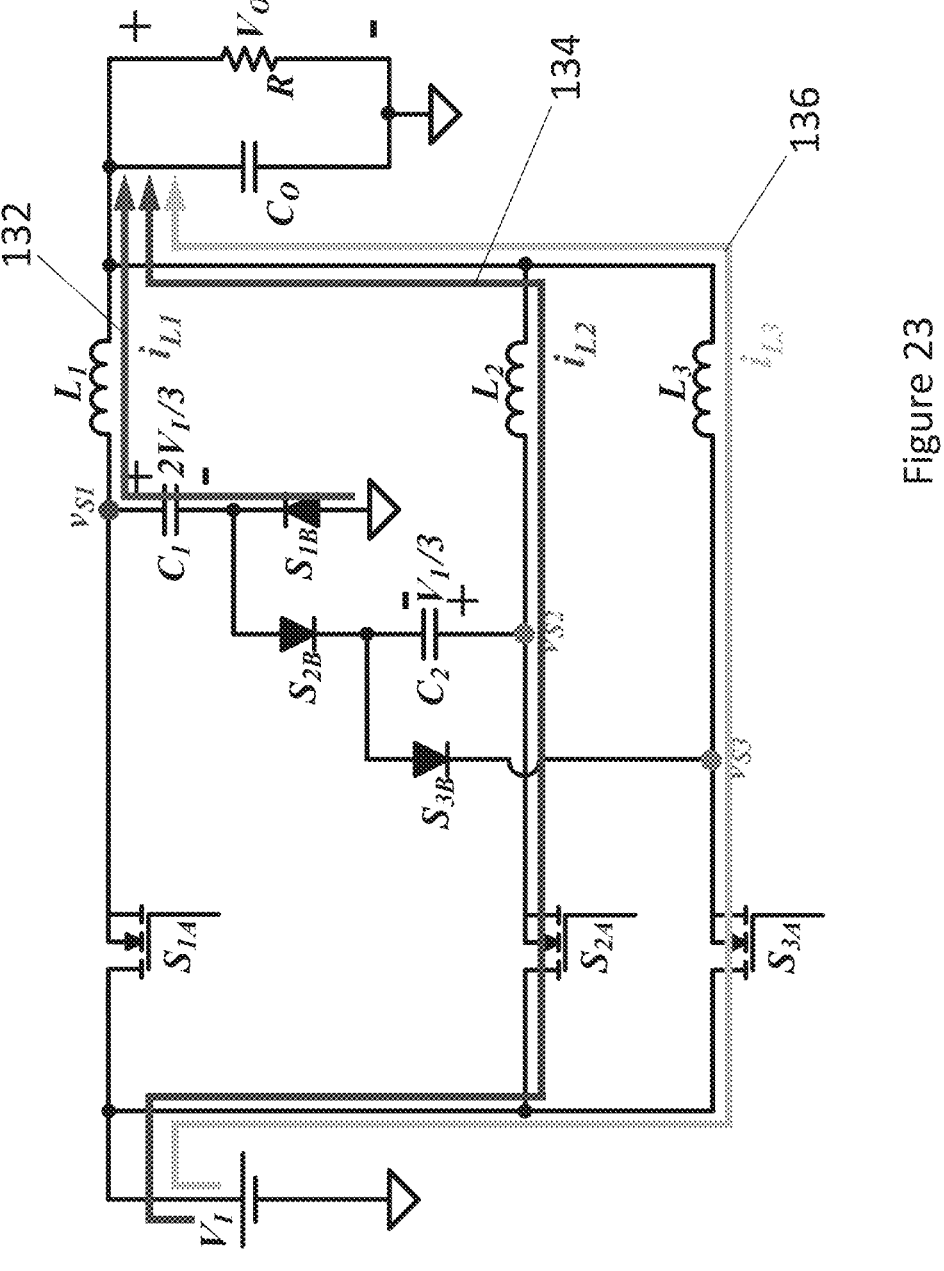
FIG. 23 shows the three-phase parallel-capacitor buck converter of FIG. 18 in state 6.

It can be seen in FIG. 23 that current flows along arrow 132 (through S1B, C1 and L1) and along arrow 134 (through S2A, and L2) and along arrow 136 (through S3A, and L3). In State 6, L2 and L3 are charged (store energy), while L1 and C1 are discharged (deliver energy). C2 is disconnected. vS1 is equal to 2VI/3, vS2 is equal to VI and vS3 is equal to VI.

17

Figure 24:
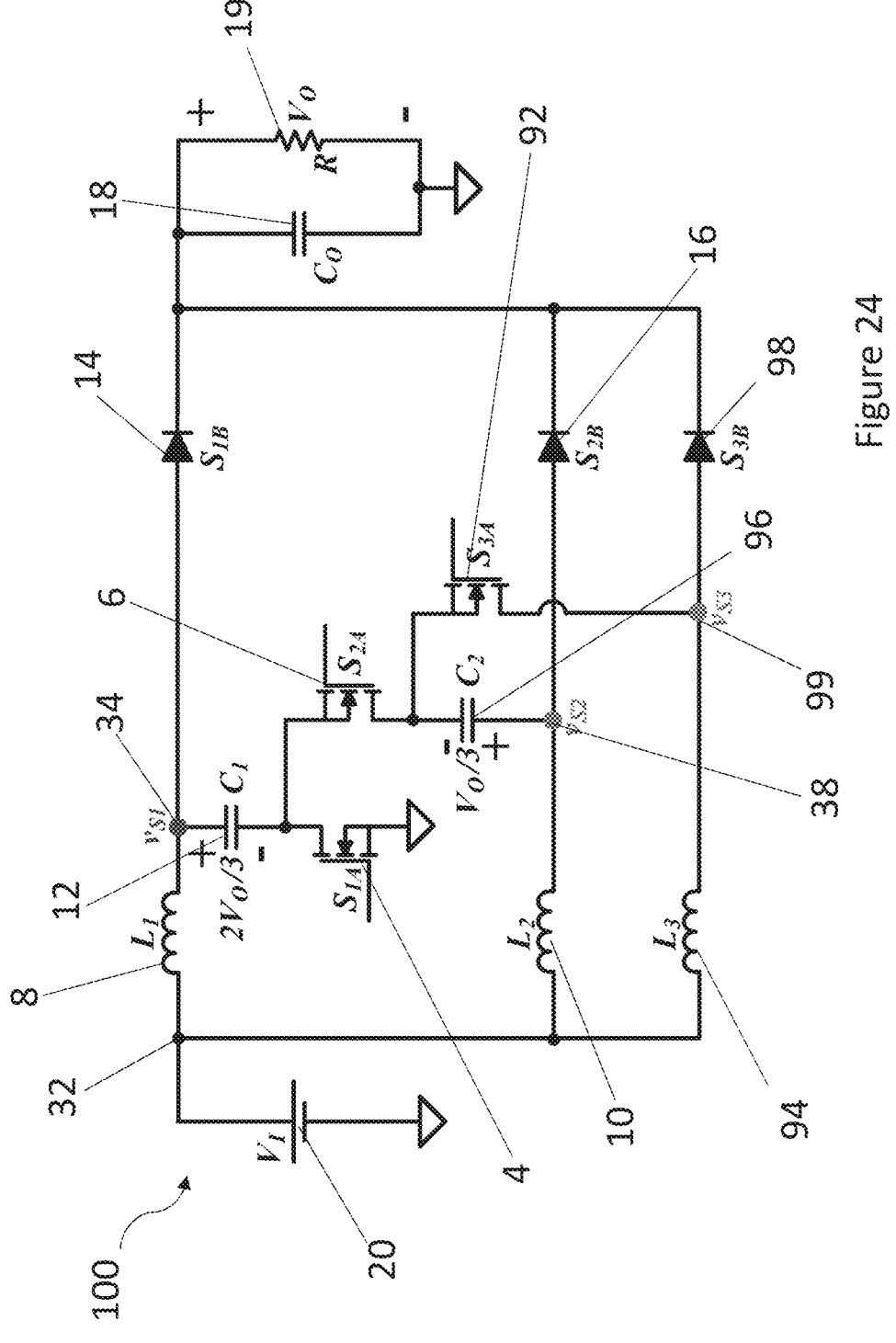
FIG. 24 shows a diagram of a three-phase parallel-capacitor boost converter.

FIG. 24 shows a three-phase (N=3) boost converter 100. It will be seen that the arrangement of the switches and the diode rectifiers in the three-phase boost converter 100 follows the same pattern as for the two-phase boost converter 70 shown in FIG. 12, i.e. with the diode rectifiers S1B 14, S2B 16, S3B 98 arranged in series with the respective inductors L1 8, L2 10, L3 94, and the switches S1A 4, S2A 6, S3A 92 arranged in the connections between the branches of the circuit element with the switched capacitors C1 12, C2 96.

Figure 25:
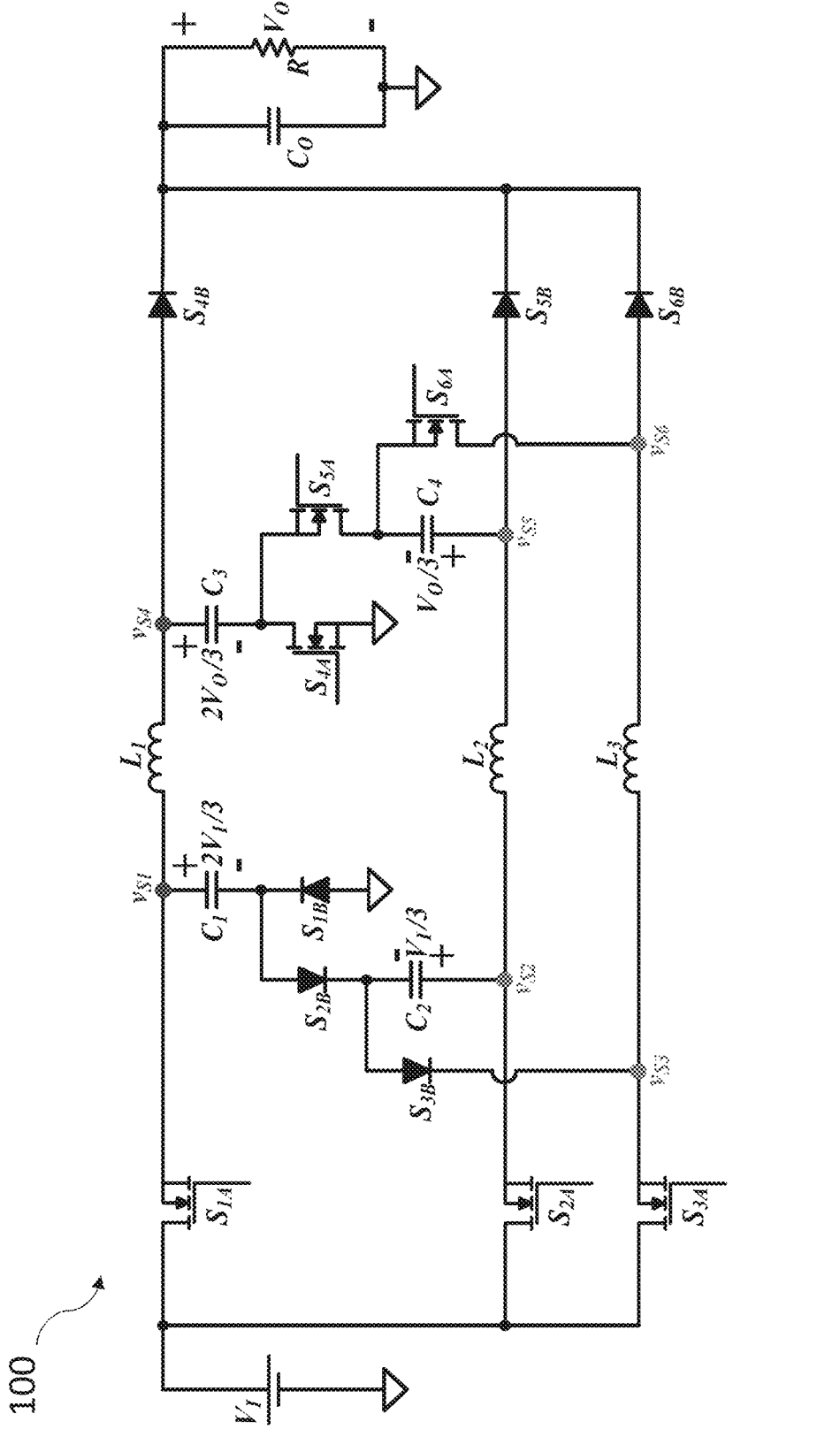
FIG. 25 shows a three-phase parallel-capacitor buck-boost converter.

FIG. 25 shows a three-phase (N=3) parallel-capacitor buck-boost converter 110. Similar to the two-phase buck-boost converter 80 shown in FIG. 17, which combines the two-phase buck converter 30 of FIG. 3 with the two-phase boost converter 70 of FIG. 12, the three-phase parallel-capacitor buck-boost converter 110 shown in FIG. 25 is a combination of the three-phase parallel-capacitor buck converter 90 of FIG. 18, and the three-phase parallel-capacitor boost converter 70 of FIG. 24.

It will therefore be seen that, in accordance with the examples disclosed herein, the advantages associated with HSCCs can be achieved while enabling different conversion ratio ranges and avoiding the need for active voltage and current balancing. In particular, a buck converter may be created having a conversion ratio range up to 1, and a boost converter may be created having a conversion ratio range from 1. Furthermore, a parallel-capacitor buck-boost converter may be created having a continuous conversion range.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A hybrid switched-capacitor power converter for converting an input voltage into an output voltage, the power converter comprising:

an input voltage source configured to provide the input voltage;

an output capacitor connected across a load at which the output voltage is provided;

at least two inductors arranged in parallel branches of a circuit element between the input voltage source and the load;

at least one switched capacitor connected between the parallel branches of the circuit element; and at least two switches operable to selectively charge and discharge the at least one switched capacitor and the at least two inductors;

wherein the power converter is configured to be operated in a switching cycle such that, at different stages in the switching cycle, the at least two inductors and the at least one switched capacitor are selectively charged and discharged;

wherein the power converter is a step-down converter arranged to convert and input voltage to an output voltage, wherein the output voltage is lower than the input voltage;

configured to provide a voltage conversion ratio in the range $$\frac{N^2 - 1}{N^2} \text{ to } 1,$$

where N is a number of phases of the power converter and is equal to two or greater;

wherein the power converter further comprises:

a first inductor arranged in a first branch of the circuit element;

a second inductor arranged in a second branch of the circuit element, in parallel with the first branch;

a first switch arranged in the first branch of the circuit element;

a second switch arranged in the second branch of the circuit element; and a switched capacitor connected between the first and second branches of the circuit element; and wherein the switching cycle comprises:

a first state, in which the first and second switches are on, such that the first and second inductors are charged and the switched capacitor is disconnected;

a second state, in which the first switch is on and the second switch is off, such that the first inductor and the switched capacitor are charged and the second inductor is discharged;

a third state, which is equivalent to the first state; and a fourth state, in which the second switch is on and the first switch is off, such that the second inductor is charged and the first inductor and the switched capacitor are discharged.

2. A hybrid switched-capacitor power converter for converting an input voltage into an output voltage, the power converter comprising:

an input voltage source configured to provide the input voltage;

an output capacitor connected across a load at which the output voltage is provided;

at least two inductors arranged in parallel branches of a circuit element between the input voltage source and the load;

at least one switched capacitor connected between the parallel branches of the circuit element; and at least two switches operable to selectively charge and discharge the at least one switched capacitor and the at least two inductors;

wherein the power converter is configured to be operated in a switching cycle such that, at different stages in the switching cycle, the at least two inductors and the at least one switched capacitor are selectively charged and discharged, wherein the power converter is a step-up converter arranged to convert and input voltage to an output voltage, wherein the output voltage is greater than the input voltage, configured to provide a voltage conversion ratio in the range $$1 \text{ to } \frac{N^2}{N^2 - 1},$$

where N is a number of phases of the power converter and is greater than or equal to 2;

wherein the power converter further comprises:

a first inductor arranged in a first branch of the circuit element;

a second inductor arranged in a second branch of the circuit element, in parallel with the first branch;

a switched capacitor connected between the first and second branches of the circuit element;

a first switch arranged between the switched capacitor and ground; and a second switch arranged in series with the switched capacitor between the first and second branches of the circuit element; and wherein the switching cycle comprises:

a first state, in which the first switch is on and the second switch is off, such that the first inductor and the switched capacitor are charged and the second inductor is discharged;

a second state, in which the first and second switches are off, such that the first and second inductors are discharged and the switched capacitor is disconnected;

a third state, in which the second switch is on and the first switch is off, such that the second inductor is charged and the first inductor and the switched capacitor are discharged; and a fourth state, which is equivalent to the first state.

3. The hybrid switched-capacitor power converter according to claim 1, wherein the switched capacitor is a first switched capacitor connected between the first and second branches of the circuit element;

the power converter further comprising:

a second switched capacitor connected between the first and second branches of the circuit element;

a third switch arranged between the second switched capacitor and ground; and a fourth switch arranged in series with the second switched capacitor between the first and second branches of the circuit element.

4. The hybrid switched-capacitor power converter as claimed in claim 3, configured to provide a continuous range of voltage conversion ratios.

5. A hybrid switched-capacitor power converter for converting an input voltage into an output voltage, the power converter comprising:

an input voltage source configured to provide the input voltage;

an output capacitor connected across a load at which the output voltage is provided;

at least two inductors arranged in parallel branches of a circuit element between the input voltage source and the load;

at least one switched capacitor connected between the parallel branches of the circuit element; and at least two switches operable to selectively charge and discharge the at least one switched capacitor and the at least two inductors;

wherein the power converter is configured to be operated in a switching cycle such that, at different stages in the switching cycle, the at least two inductors and the at least one switched capacitor are selectively charged and discharged;

wherein the power converter comprises:

a first inductor arranged in a first branch of the circuit element;

a second inductor arranged in a second branch of the circuit element, in parallel with the first branch;

a third inductor arranged in a third branch of the circuit element, in parallel with the second branch;

a first switched capacitor and a second switched capacitor connected between the first and second branches of the circuit element;

at least three switches operable to selective charge and discharge the first switched capacitor and the second switched capacitor; and wherein the power converter is configured to be operated in a switching cycle such that, at different stages in the switching cycle, the first inductor, the second inductor, the third inductor, the first switched capacitor and the second switched capacitor are selectively charged and discharged.

6. The hybrid switched-capacitor power converter according to claim 2, wherein the switched capacitor is a first switched capacitor connected between the first and second branches of the circuit element;

the power converter further comprising:

a second switched capacitor connected between the first and second branches of the circuit element;

a third switch arranged between the second switched capacitor and ground; and a fourth switch arranged in series with the second switched capacitor between the first and second branches of the circuit element.

* * * * *